United States Patent
Okanaka

[11] Patent Number: 6,036,182
[45] Date of Patent: Mar. 14, 2000

[54] FLUID-FILLED CYLINDRICAL VIBRATION DAMPING DEVICE HAVING DIFFERENT RESONANCE FREQUENCIES OF FLUID

[75] Inventor: Takehiro Okanaka, Kasugai, Japan

[73] Assignee: Tokai Rubber Industries, Ltd., Japan

[21] Appl. No.: 08/957,609

[22] Filed: Oct. 27, 1997

[30] Foreign Application Priority Data

Oct. 29, 1996 [JP] Japan ..................................... 8-286501

[51] Int. Cl.[7] ...................................................... F16F 5/00
[52] U.S. Cl. ...................................................... 267/140.12
[58] Field of Search ........................... 267/140.12, 140.3, 267/140.4, 140.5, 141.1, 141.2, 141.3, 141.4, 140.11, 140.13, 219

[56] References Cited

U.S. PATENT DOCUMENTS

| | | |
|---|---|---|
| 4,749,173 | 6/1988 | Kanda . |
| 4,936,555 | 6/1990 | Ishiyama et al. .................. 267/140.12 |
| 5,213,313 | 5/1993 | Tsutsumida et al. . |

FOREIGN PATENT DOCUMENTS

| | | | |
|---|---|---|---|
| 004121769 | 1/1992 | Germany ........................... 267/140.12 |
| 63-214531 | 9/1988 | Japan . |
| 402042226 | 2/1990 | Japan ................................ 267/140.12 |
| 5-47580 | 6/1993 | Japan . |
| 405280576 | 10/1993 | Japan ................................ 267/140.12 |
| 405306729 | 11/1993 | Japan ................................ 267/140.12 |
| 8-4826 | 1/1996 | Japan . |

*Primary Examiner*—Matthew C. Graham
*Assistant Examiner*—Melanie Talavera
*Attorney, Agent, or Firm*—Parkhurst & Wendel, L.L.P.

[57] ABSTRACT

A fluid-filled cylindrical vibration damping device comprising: an inner sleeve; an outer sleeve disposed radially outwardly of the inner sleeve; an elastic body interposed between the inner and outer sleeves; a pressure-receiving chamber partially defined by the elastic body; a first flexible diaphragm partially defines a first equilibrium chamber; a second flexible diaphragm partially defines a second equilibrium chamber; a first orifice passage which permits fluid communication between the pressure-receiving and first equilibrium chambers; for defining a second orifice passage which permits fluid communication between the first and second equilibrium chambers; the second orifice passage having a ratio A/L which is smaller than that of the first orifice passage, wherein A and L are a cross sectional area and a length of each orifice passage, respectively, and wherein the fluid flowing in the first orifice passage has a first resonance frequency f1 while the fluid flowing in the second orifice passage has a second resonance frequency f2 which is higher than the first resonance frequency f1.

12 Claims, 14 Drawing Sheets

FLUID-FILLED CYLINDRICAL VIBRATION DAMPING DEVICE HAVING DIFFERENT RESONANCE FREQUENCIES OF FLUID

This application is based on Japanese Patent Application No. 8-286501 filed Oct. 29, 1997, the content of which is incorporated hereinto by reference.

BACKGROUND OF THE INVENTION

1. Field of the Invention

The present invention relates generally to a fluid-filled cylindrical vibration damping device adapted to provide a vibration damping or isolating effect based on flows or resonance of a fluid contained therein. More particularly, this invention is concerned with such a fluid-filled cylindrical vibration damping device which is capable of effectively damping or isolating the input vibrations over a wide frequency range, based on the flows of the fluid.

2. Discussion of the Related Art

As one type of a vibration damping device interposed between two members of a vibration system, there is known a fluid-filled cylindrical vibration damping device which includes (a) an inner sleeve member, (b) an outer sleeve member disposed radially outwardly of the inner sleeve with a suitable radial distance therebetween, (c) an elastic body interposed between the inner sleeve member and the outer sleeve member for connecting these two sleeve members, (d) a pressure-receiving chamber which is partially defined by the elastic body and filled with a non-compressible fluid such as water, (e) an equilibrium chamber which is partially defined by a flexible diaphragm and filled with the non-compressible fluid, and (f) an orifice passage for permitting flows of the fluid between the pressure-receiving and equilibrium chambers. Such a vibration damping device is used as an engine mount for a motor vehicle. The cylindrical vibration damping device of this type is capable of exhibiting an excellent vibration damping or isolating effect based on the flows or resonance of the fluid which is forced to flow through the orifice passage upon application of the vibrations between the inner and outer sleeves.

Generally, the engine mount for the motor vehicle is required to exhibit different damping or isolating characteristics with respect to the input vibrations over a wide frequency range since the frequency of the vibration to be damped changes depending upon the running condition of the vehicle, for instance. For example, the engine idling vibrations applied to the engine mount while the vehicle is stationary with the engine placed in its idling state have a plurality of frequency order components. In addition, in a motor vehicle equipped with an automatic transmission, the frequency of the input vibration changes with a change of the engine speed in different positions of the transmission. In general, the engine mount is required to exhibit a vibration isolating effect with respect to the input vibrations over a wide frequency range of 20–40 Hz.

However, the above-described fluid-filled cylindrical vibration damping device exhibits an effective vibration damping or isolating effect based on the fluid flows through the orifice passage, with respect to only the input vibrations in a relatively narrow frequency range which is determined depending upon the length and cross sectional area of the orifice passage. Further, the dynamic spring constant exhibited based on the resonance of the fluid flowing through the orifice passage is relatively low when the vibration frequency is lower than the resonance frequency of the fluid flowing through the orifice passage, but is abruptly increased in the neighborhood of the resonance frequency. Namely, the dynamic spring constant of the engine mount considerably increases when the input vibration has a frequency higher than the frequency to which the orifice passage is tuned, whereby the vibration damping effect to be exhibited by the engine mount is considerably deteriorated.

Thus, the conventional fluid-filled cylindrical vibration damping device is not capable of providing a vibration isolating effect exhibited by the low dynamic spring constant based on the fluid flows, over a wide frequency range to be required. Accordingly, the conventional vibration damping device does not provide the desired vibration damping or isolating characteristics.

SUMMARY OF THE INVENTION

It is therefore an object of the present invention to provide a fluid-filled cylindrical vibration damping device which exhibits a low dynamic spring constant based on flows of the fluid which is forced to flow through an orifice passage over a wide frequency range of the input vibrations.

It is an optional object of the invention to provide such a fluid-filled cylindrical vibration damping device wherein a considerable increase of the dynamic spring constant is prevented in the neighborhood of the resonance frequency of the fluid flowing through the orifice passage, so as to inhibit considerable deterioration of its vibration damping or isolating characteristics, so that the fluid-filled cylindrical damping device is capable of exhibiting an excellent vibration damping or isolating effect with respect to the input vibrations over a wide frequency range.

The above objects of the present invention may be attained according to the principle of the present invention, which provides a fluid-filled cylindrical vibration damping device comprising: (a) an inner sleeve member; (b) an outer sleeve member disposed radially outwardly of the inner sleeve member; (c) an elastic body interposed between the inner sleeve member and the outer sleeve member for elastically connecting the inner and outer sleeve members with each other; (d) a pressure-receiving chamber which is formed between the inner sleeve member and the outer sleeve member and filled with a non-compressible fluid, the pressure-receiving chamber being partially defined by the elastic body so that a pressure of the fluid in the pressure-receiving chamber changes upon application of a vibrational load to the vibration damping device; (e) a first flexible diaphragm which partially defines a first equilibrium chamber filled with the non-compressible fluid, the first flexible diaphragm being displaceable to permit a change in a volume of the first equilibrium chamber; (f) a second flexible diaphragm which partially defines a second equilibrium chamber filled with the non-compressible fluid, the second flexible diaphragm being displaceable to permit a change in a volume of the second equilibrium chamber; (g) first orifice passage defining means for defining a first orifice passage which permits fluid communication between the pressure-receiving chamber and the first equilibrium chamber; (h) second orifice passage defining means for defining a second orifice passage which permits fluid communication between the first equilibrium chamber and the second equilibrium chamber, the second orifice passage having a ratio A/L which is smaller than that of the first orifice passage, wherein A and L are a cross sectional area and a length of each of the first and second orifice passages, respectively; and (i) wherein the fluid flowing in the first orifice passage has a first resonance frequency f1 while the fluid flowing in the second orifice passage has a second resonance frequency f2 which is higher than the first resonance frequency f1.

In the thus constructed fluid-filled cylindrical vibration damping device, the first and second equilibrium chambers are connected in series with each other with respect to the pressure-receiving chamber through the first and second orifice passages. Upon application of the vibrational load to the fluid-filled cylindrical vibration damping device, a pressure of the fluid in the pressure-receiving chamber changes due to elastic deformation of the elastic body, so as to cause fluid flows between the pressure-receiving chamber and the first equilibrium chamber, and between the first equilibrium chamber and the second equilibrium chamber, through the first and second orifice passages, respectively. Thus, the fluid-filled cylindrical vibration damping device exhibits a desired vibration damping or isolating effect owing to the resonances of the fluid flowing through the first and second orifice passages, respectively.

In the present fluid-filled cylindrical vibration damping device, the second orifice passage has a ratio A/L which is lower than that of the first orifice passage, wherein A and L represent a cross sectional area and length of each of the first and second orifice passages, respectively. Further, the resonance frequency of the fluid flowing in the second orifice passage is higher than that of the fluid flowing in the first orifice passage. This arrangement assures a low dynamic spring constant based on the resonance of the fluid flowing through the first orifice passage while preventing an increase of the dynamic spring constant at a frequency which is higher than the resonance frequency of the fluid flowing through the first orifice passage, owing to the low dynamic spring constant exhibited by the resonance of the fluid flowing through the second orifice passage. Accordingly, the present fluid-filled cylindrical vibration damping device exhibits an excellent damping or isolating characteristic owing to the low dynamic spring constant over a sufficiently wide frequency range of the input vibrations.

In the fluid-filled cylindrical vibration damping device as described above, the pressure-receiving chamber, first equilibrium chamber and second equilibrium chamber are connected in series with each other via the first and second orifice passages. This arrangement does not require any switching means such as a valve for switching the operating states of the two orifice passages, so that the engine mount which exhibits an excellent vibration damping capability can be obtained in a simplified structure and with an excellent manufacturing efficiency.

According to a first preferred form of the present invention, the first flexible diaphragm which partially defines the first equilibrium chamber is provided by a first elastic layer while the second flexible diaphragm which partially defines the second equilibrium chamber is provided by a second elastic layer, the first and second equilibrium chambers being partially defined by respective walls (48, 50) which have substantially the same expansion spring constant.

In the above first preferred form of the fluid-filled cylindrical vibration damping device, the expansion spring constants of the first and second equilibrium chambers are effectively exhibited based on the elastic deformation the first and second elastic layers. The term "expansion spring constant" used herein means a spring constant of the walls which define each equilibrium chamber, when the walls are expanded due to the increase of the pressure in the equilibrium chamber. Further, the expansion spring constant of the the first equilibrium chamber is made substantially equal to that of the second equilibrium chamber. This arrangement allows easy tuning of the first and second orifice passages. The expansion spring constant of the first equilibrium chamber may be made different from that of the second equilibrium chamber, depending upon the cross sectional area and length of each of the first and second orifice passages and the desired tuning characteristics of these orifice passages.

According to a second preferred form of the present invention, an axial void is formed between the inner sleeve member and the outer sleeve member and in one of two circumferential portions of the damping device which are diametrically opposed to each other while the elastic body is interposed between the inner sleeve member and the outer sleeve member and in substantially the other of the two circumferential portions of the damping device, the first equilibrium chamber and the second equilibrium chamber being located within the axial void such that the first and second equilibrium chambers are spaced apart from each other in a circumferential direction of the axial void, the first and second flexible diaphragms which define the first and second equilibrium chambers, respectively, being provided by the first and second elastic layers which are formed substantially independently of the elastic body.

In the above second preferred form of the fluid-filled cylindrical vibration damping device, the pressure-receiving chamber and the first and second equilibrium chambers are formed to have the desired volumes by efficiently utilizing a space between the inner and outer sleeve members. Since the first and second elastic layers are formed substantially independently of the elastic body, the first and second elastic layers do not directly receive the vibrational load and the static load or weight of the power unit, so that the durability of these elastic layers are effectively improved.

According to a third preferred form of the present invention, the fluid-filled cylindrical vibration damping device further comprises an intermediate sleeve bonded to an outer circumferential surface of the elastic body and including a plurality of windows through which a first pocket that is partially defined by the elastic body, a second pocket that is partially defined by the first flexible diaphragm and a third pocket that is partially defined by the second flexible diaphragm are open in an outer circumferential surface of the intermediate sleeve, the outer sleeve member being fitted on the intermediate sleeve so as to fluid-tightly close the first, second and third pockets, to thereby provide the pressure-receiving chamber, the first equilibrium chamber and the second equilibrium chamber, respectively.

In the above third preferred form of the present fluid-filled cylindrical vibration damping device, the pressure-receiving chamber and the first and the second equilibrium chambers are easily formed while assuring excellent fluid tightness thereof. The first and second flexible diaphragms are provided by the first and second curved elastic layers, respectively, which are open in the outer circumferential surface of the intermediate sleeve through the windows thereof, so as to form the second and third pockets, respectively. According to this arrangement, the first and second elastic layers are formed integrally with the elastic body while maintaining the structural independency thereof from the elastic body.

According to a fourth preferred form of the present invention, the second orifice passage is partially defined by an elastic member which is elastically deformed based on a pressure of the fluid which is forced to flow through the second orifice passage.

In the above fourth preferred form of the present fluid-filled cylindrical vibration damping device, the second orifice passage can be tuned by utilizing the elastic deformation of the elastic member which partially defines the second orifice passage.

According to a fifth preferred form of the present invention, a ratio f2/f1 of the second resonance frequency f2 to the first resonance frequency f1 is not higher than 2.

The above fifth preferred form of the present fluid-filled cylindrical vibration damping device prevents an increase in the dynamic spring constant which would be caused at a frequency which is higher than the resonance frequency f1 of the fluid in the first orifice passage by the second orifice passage.

According to a sixth preferred form of the present invention, a difference f2–f1 between the second resonance frequency f2 and the first resonance frequency f1 is not larger than 30 Hz.

The above sixth preferred form of the present fluid-filled cylindrical vibration damping device prevents an increase in the dynamic spring constant which would be caused at a frequency which is higher than the resonance frequency f1 of the fluid flowing through the first orifice passage by the second orifice passage.

According to a seventh preferred form of the present invention, the elastic body is disposed in one of two circumferential portions of the vibration damping device which are opposed to each other in a diametric direction in which the vibrational load is primarily applied, while the axial void is formed in the other of the two circumferential portions, the first and second equilibrium chambers being formed on circumferentially opposite sides of a portion of the axial void which is opposed to the inner sleeve member in the direction in which the vibrational load is primarily applied, so that the first and second equilibrium chambers are spaced from each other by a suitable distance in a circumferential direction of the outer sleeve, the second orifice passage which permits fluid communication between the first and second equilibrium chambers being formed so as to extend along an inner circumferential surface of the outer sleeve member in said circumferential direction thereof, between portions of the inner sleeve member and the outer sleeve member which are opposed to each other.

According to an eighth preferred form of the present invention, the fluid-filled cylindrical vibration damping device further comprises an elastic stop member which protrudes from at least one of the inner sleeve member and the outer sleeve member toward the other of the inner sleeve member and the outer sleeve member, between the first and second equilibrium chambers in the direction in which the vibrational load is primarily applied. When the elastic stop member is reinforced by a reinforcing member, an amount of relative displacement of the inner and outer sleeve members is further effectively restricted. Moreover, the presence of the reinforcing member in the stop member is effective to prevent a change in the cross sectional area of the second orifice passage which extends along the inner circumferential surface of the outer sleeve member, between the first and second equilibrium chambers, when the vibrational load is applied to the vibration damping device, for instance.

BRIEF DESCRIPTION OF THE DRAWINGS

The above and optional objects, features and advantages of the present invention will be better understood by reading the following detailed description of presently preferred embodiments of the invention, when considered in connection with the accompany drawings, in which.

DETAILED DESCRIPTION OF PREFERRED EMBODIMENTS

Figure 1:
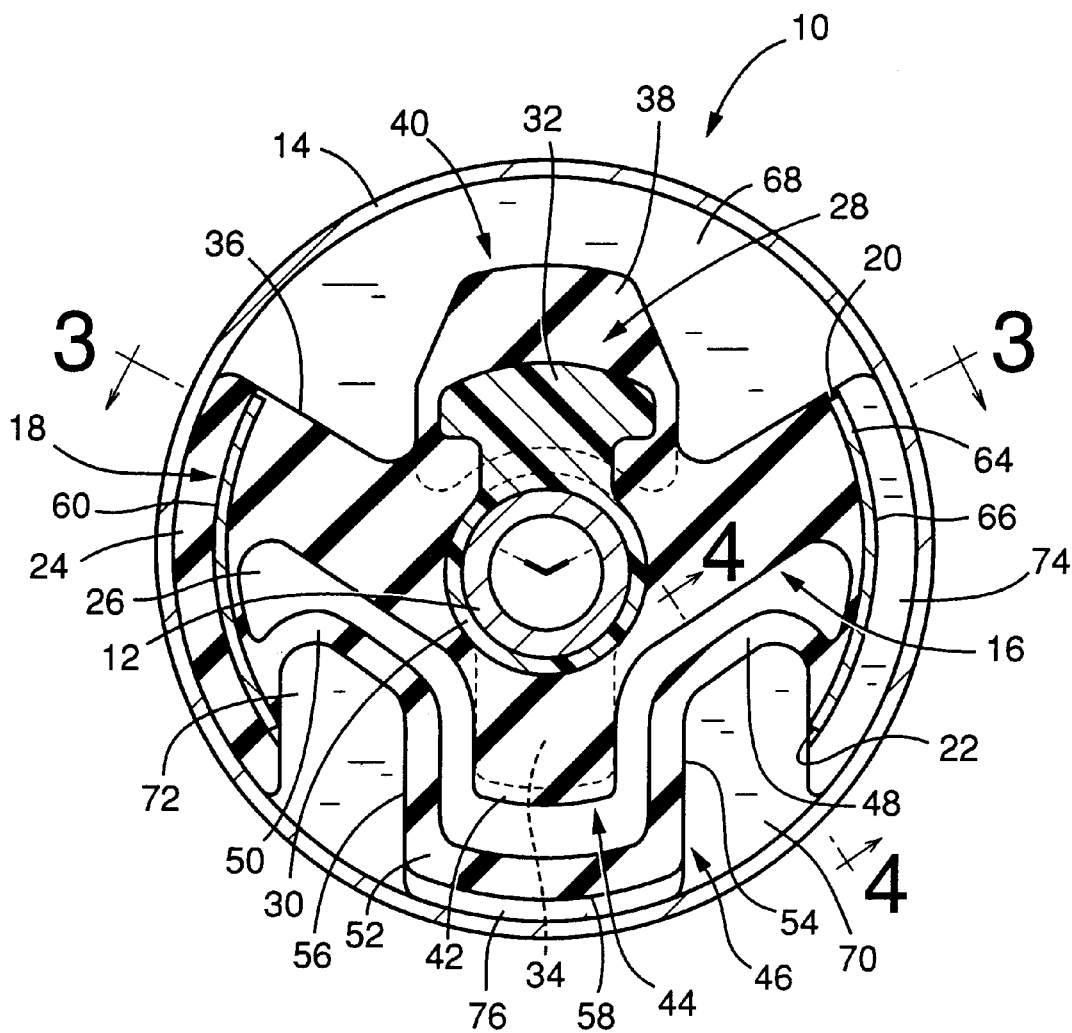
FIG. 1 is an elevational view in transverse cross section of an engine mount for use on a motor vehicle constructed according to a first embodiment of the present invention.

Referring first to FIGS. 1–4, there is shown an engine mount 10 which is constructed according to a first embodiment of the present invention, for use on a front-engine front-drive motor vehicle (FF vehicle). This engine mount 10 includes an inner sleeve 12 and an outer sleeve 14 which are made of metal and disposed such that the two sleeves 12, 14 are spaced apart from each other in a radial or diametric direction of the engine mount 10. The inner sleeve 12 has an axis or center which is radially offset from an axis or center of the outer sleeve 14 by a slight radial distance. The inner and outer sleeves 12, 14 are elastically connected with each other by an elastic body 16 interposed therebetween. When the engine mount 10 is installed on the motor vehicle, one of the inner and outer sleeves 12, 14 is attached to a body of the vehicle and the other is attached to a power unit, so that the power unit is supported by the vehicle body via the engine mount 10 in a vibration damping or isolating fashion. When the engine mount 10 is installed on the vehicle as described above, a static load or weight of the power unit acts on the elastic body 16, and the elastic body 16 is elastically deformed so that the inner and outer sleeves 12, 14 are placed in a substantially coaxial or concentric relation with each other. With the engine mount 10 installed on the vehicle as described above, the static load or the weight of the power unit and a dynamic or vibrational load to be damped by the engine mount 10 act on the inner and outer sleeves 12, 14 in a diametric direction of the engine mount 10 in which the inner and outer sleeves 12, 14 are initially offset from each other.

Described more specifically, the inner sleeve 12 is a cylindrical member having a relatively small diameter and a relatively large wall thickness. Radially outwardly of the inner sleeve 12, there is disposed an intermediate sleeve 18 which is a cylindrical member having a relatively large diameter and a relatively small wall thickness. The intermediate sleeve 18 is radially offset from the inner sleeve 12 by a slight radial distance, and is formed with a first window 20 and a second window 22 such that the two windows 20, 22 are opposed with each other in a diametric direction of the engine mount 10 in which the inner and intermediate sleeves 12, 18 are offset from each other. Described in detail, the first window 20 of the intermediate sleeve 18 is located in an upper one of two diametrically opposite circumferential portions of the intermediate sleeve 18 at which the radial distance between the inner sleeve 12 and the intermediate sleeve 18 is larger in the offset direction of the inner and intermediate sleeves 12, 18 of FIG. 1, while the second window 22 is located in a lower one of the two diametrically opposite circumferential portions at which the radial distance between the inner and intermediate sleeves 12, 18 is smaller in the offset direction. Thus, the inner sleeve 12 and the intermediate sleeve 18 are positioned relative with each other.

The elastic body 16 is interposed between the inner sleeve 12 and the intermediate sleeve 18. During vulcanization of a rubber material for the elastic body 16, the inner and intermediate sleeves 12, 18 are bonded to the elastic body 16, so as to provide an integral assembly. On the outer circumferential surface of the intermediate sleeve 18, there is provided a thin sealing rubber layer 24 which is formed integrally with the elastic body 16, so as to cover the entire outer circumferential surface of the intermediate sleeve 18.

The elastic body 16 is located between the inner and intermediate sleeves 12, 18 only in the upper circumferential portion of the engine mount 10 at which the radial distance between the inner and intermediate sleeves 12, 18 is larger in the above-indicated offset direction of the two sleeves 12, 18 as seen in FIG. 1. The circumferential length of the elastic body 16 is substantially half of the circumference of the intermediate sleeve 18. According to this arrangement, an axial void 26 is formed between the inner and intermediate sleeves 12, 18 and in the lower circumferential portion of the engine mount 10 at which the radial distance between the two sleeves 12, 18 is smaller. The axial void 26 is formed through the entire axial length of the elastic body 16 and has a circumferential length which corresponds to a half of the circumference of the intermediate sleeve 18. The provision of the axial void 26 effectively reduces or prevents occurrence of tensile stress in the elastic body 16 when the engine mount 10 is installed on the vehicle and the weight of the power unit acts thereon, leading to an improved durability of the elastic body 16.

To the outer circumferential surface of the inner sleeve 12, there is fixed stop block 28 which is made of a hard material such as a synthetic resin. The stop block 28 consists of a cylindrical portion 30 which is fixed on the outer circumferential surface of the inner sleeve 12, a first stop portion 32 which protrudes from the axially intermediate portion of the cylindrical portion 30 in the radially outward direction of the inner sleeve 12, and a pair of second stop portions 34, 34 each of which protrudes from the corresponding axial ends of the cylindrical portion 30 in the radially outward direction of the inner sleeve 12 which is diametrically opposite to the direction in which the first stop portion 32 protrudes. The first stop portion 32 is generally T-shaped in cross section, namely, it has a larger circumferential length at its radially outer end than at its radially inner end, as shown in FIG. 1. The stop block 28 is positioned relative to the inner sleeve 12 and the intermediate sleeve 18 such that the first stop portion 32 protrudes in the upper circumferential portion of the engine mount 10 at which the radial distance between the inner and intermediate sleeves 12, 18 is larger in the offset direction, and that the pair of second stop portions 34, 34 protrude in the lower circumferential portion of the engine mount 10 at which the radial distance between the inner and intermediate sleeves 12, 18 is smaller as seen in the offset direction.

The elastic body 16 has a first pocket 36 which is open in the outer circumferential surface thereof. The first pocket 36 is aligned with the first window 20 of the intermediate sleeve 18 so that the first pocket 36 is open in the outer circumferential surface of the intermediate sleeve 18 through the first window 20. The walls of the first pocket 36 are defined by the elastic body 16. The first pocket 36 is generally V-shaped in cross section as seen in FIG. 1, whose walls are inclined by a suitable angle such that the distance between the walls in a direction perpendicular to the above-indicated offset direction in a plane parallel to the center line of the engine mount 10 increases in the radially outward direction. This arrangement assures rigidity of the elastic body 16 required for supporting the power unit, and durability of the engine mount 10. The first stop portion 32 protrudes from the middle portion of the bottom of the first pocket 36. To the outer surface of the first stop portion 32, a rubber buffer 38 is fixed so as to cover the outer surface of the first stop portion 32. The first stop portion 32 and the rubber buffer 38 cooperate with each other to provide a first stop member 40 which protrudes from the bottom of the first stop pocket 38 toward the opening thereof with a suitable radial distance.

The outer surface of each of the stop portions 34, 34 which protrude from the inner sleeve 12 in the axial void 26 is covered with a rubber buffer 42, so as to form a second stop member 44 which protrudes by a suitable radial distance in a radial direction opposite to the radial direction in which the first stop member 40 protrudes, as seen in the load receiving direction. The rubber buffers 38, 42 which partially constitute the respective first and second stop members 40, 44 are formed, integrally with the elastic body 16.

The elastic body 16 cooperates with a comparatively easily displaceable thin elastic member 46 to define the axial void 26. The elastic member 46 consists of a first curved elastic layer 48, a second curved elastic layer 50, and a connecting rubber member 52 in the form of a sheet which connects adjacent peripheral ends of the first and second elastic layers 48, 50 with each other. The first and second elastic members 48, 50 are spaced apart from each other in the circumferential direction, so that they are located on the circumferentially opposite sides of the second stop member 44, such that the connecting rubber member 52 is opposed to the second stop member 44 in the offset direction of the inner and intermediate sleeves 12, 18.

The thin elastic member 46 partially defining the axial void 26 as described above is bonded by vulcanization at its opposite ends to the inner circumferential surface of a peripheral portion of the intermediate sleeve 18 which defines the second window 22, whereby the second window 22 is closed. According to this arrangement, a second pocket 54 and a third pocket 56 are provided by the first elastic layer 48 and the second elastic layer 50, respectively. These second and third pockets 54, 56 are open in the outer circumferential surface of the intermediate sleeve 18 through the second window 22, and are spaced apart from each other by a suitable circumferential distance. The connecting rubber member 52 extends between the openings of the two pockets 54, 56 has a groove 58 which which extends in the circumferential direction of the engine mount 10, and which is formed in its outer surface. The second and third pockets 54, 56 are connected with each other by this groove 58.

The rubber connecting member 52 is opposed to the second stop member 44 in the offset direction of the inner and intermediate sleeves 12, 18. The second stop portions 34, 34 made of a hard material are formed at the axially opposite ends of the cylindrical portion 30 of the stop block 28, so that the second stop portions 34, 34 are opposed to the corresponding axial end portions of the intermediate sleeve 18. According to this arrangement, the axially intermediate portion of the second stop member 44 which is interposed between the pair of second stop portions 34, 34 is substantially formed of only the rubber buffer 42, so that the axially intermediate portion of the stop member 44 has a sufficiently low hardness. Thus, the connecting rubber member 52 is prevented from being subjected to an excessive stress due to the abutting contact of the second stop member 44 onto the connecting rubber member 52, leading to an improved durability of the connecting rubber member 52.

Figure 3:
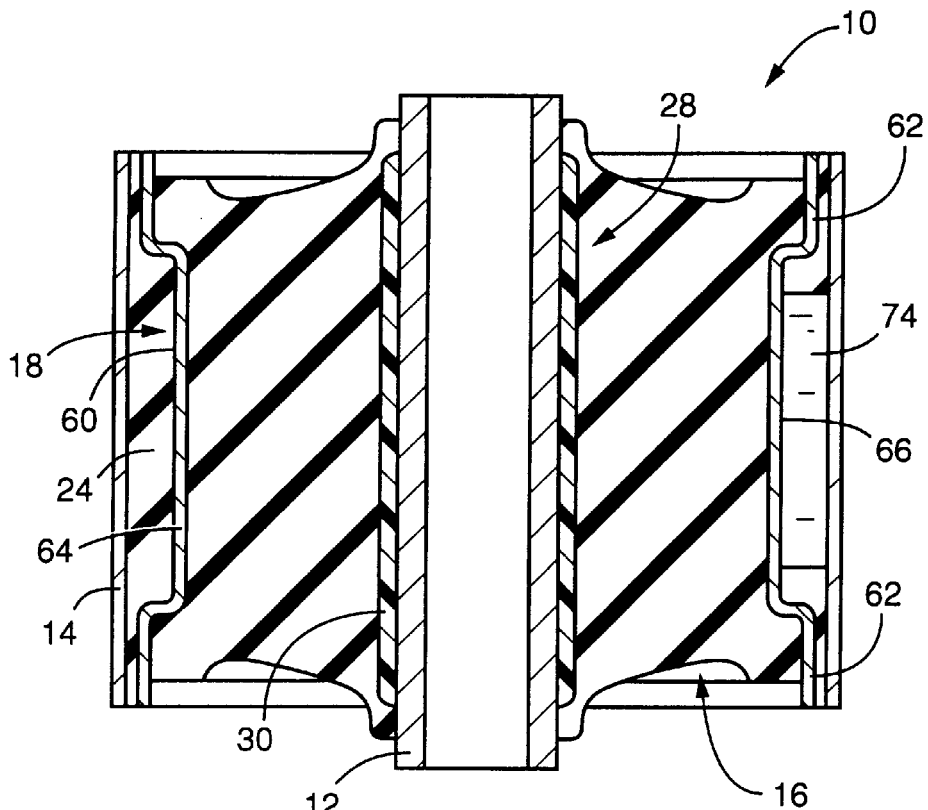
FIG. 3 is a cross sectional view taken along line 3—3 of FIG. 1.
Figure 4:
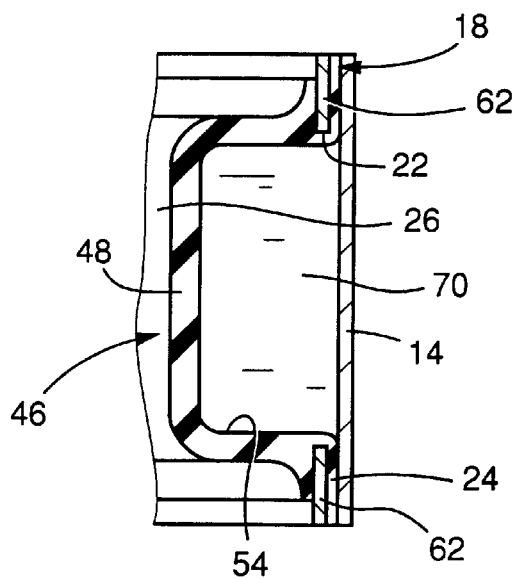
FIG. 4 is a cross sectional view taken along line 4—4 of FIG. 1.

The intermediate sleeve 18 has part-circumferential grooves 60, 60 each of which extends between the adjacent circumferential ends of the first and second windows 20, 22. In other words, as shown in FIG. 3, the intermediate sleeve 18 has shoulders or stepped portions in its axially opposite end portions, namely, includes large-diameter end portions 62, 62 located axially outwardly of the grooves 60, and a small-diameter portion 64 interposed between the large-diameter portions 62, 62. Each of the first and second windows 20, 22 of the intermediate sleeve 18 has an axial length which is larger than that of the small-diameter portion 64. One of the part-circumferential grooves 60, 60 is filled with the sealing rubber layer 24, while the other groove is partially filled with the sealing rubber layer 24, so as to provide a groove 66 which extends in the circumferential direction of the intermediate sleeve 18. This groove 66 connects the first and second pockets 36, 54 to each other.

After the elastic body 16 is subjected to pre-compression as needed, the outer sleeve 14 is fitted on the integral assembly constructed as described above such that the outer sleeve 14 is fixed on the intermediate sleeve 18. As a result, the first and second windows 20, 22 of the intermediate sleeve 18 are fluid-tightly closed by the outer sleeve 14. The sealing rubber layer 24 provided on the outer circumferential surface of the intermediate sleeve 18 is compressed by and between the outer sleeve 14 and the intermediate sleeve 18, so as to assure fluid-tightness therebetween.

The openings of the first, second and third pockets 36, 54, 56 are fluid-tightly closed by the outer sleeve 14, to thereby provide a pressure-receiving chamber 68 which is partially defined by the elastic body 16, a first and a second equilibrium chamber 70, 72 which are partially defined by the first and second elastic layers 48, 50, respectively. A pressure of the fluid in the pressure-receiving chamber 68 changes upon application of the vibrations to the engine mount 10, while the volume of each of the first and second equilibrium chambers 70, 72 is easily variable based on the elastic deformation of the first and second elastic layers 48, 50. In the present embodiment, the first and second elastic layers 48, 50 are formed of the same material, and have substantially the same thickness, shape and size, so that the first and second equilibrium chambers 70, 72 have substantially the same expansion spring constant.

The pressure-receiving chamber 68 and the first and second equilibrium chambers 70, 72 are filled with a suitable non-compressible fluid such as water, alkylene glycol, polyalkylene glycol or silicone oil. For permitting the engine mount 10 to exhibit an effective vibration damping or isolating effect based on the resonance of the fluid, it is desirable that the fluid have a relatively low viscosity, preferably, not higher than 0.1 Pa.s.

With the outer sleeve 14 fitted on the integral assembly as described above, the openings of the groove 58 and the groove 66 which are open in the outer circumferential surface of the integral assembly are fluid-tightly closed by the outer sleeve 14, to thereby provide a first orifice passage 74 which corresponds to the groove 66 and connects the pressure-receiving and first equilibrium chambers 68, 70 with each other for fluid communication therebetween, and a second orifice passage 76 which corresponds to the groove 58 and connects the first and second equilibrium chambers 70, 72 with each other for fluid communication therebetween. Namely, the pressure-receiving chamber 68, first equilibrium chamber 70 and second equilibrium chamber 72 are spaced apart from one another in the circumferential direction of the engine mount 10, and are connected in series with one another in the circumferential direction through the first and second orifice passages 74, 76.

Upon application of the vibrations between the inner and outer sleeves 12, 14 with the engine mount 10 installed on the vehicle such that the inner sleeve 12 is attached to one of the vehicle body and the power unit while the outer sleeve 14 is attached to the other of the vehicle body and the power unit, there arises a difference of the fluid pressures between the pressure-receiving chamber 68 and the first and second equilibrium chambers 70, 72, whereby the fluid is forced to flow between the pressure-receiving and the first equilibrium chambers 68, 70 and between the first and second equilibrium chambers 70, 72, through the first orifice passage 74 and second orifice passage 76, respectively. Thus, the engine mount 10 exhibits an intended damping or isolating effect with respect to the input vibrations to which the first and second orifice passages 74, 76 are respectively tuned, on the basis of the resonances of the fluid flowing through the first and second orifice passages 74, 76, respectively. When an excessive vibrational load is applied between the inner and outer sleeves 12, 14, the amount of relative displacement of the inner and outer sleeves 12, 14 in the bound and rebound directions of the input vibrations is limited by the abutting contact of the first stop members 40 with the outer sleeve 14, and the abutting contact of the second stop member 44 toward the outer sleeve 14, respectively.

In the present embodiment, the first orifice passage 74 is tuned so as to exhibit a low dynamic spring constant with respect to a low-frequency vibration around 24 Hz such as a first-order component of the engine idling vibrations based on the resonance of the fluid flowing therethrough, while the second orifice passage 76 is tuned so as to prevent a considerable increase of the dynamic spring constant at a frequency which is higher than the resonance frequency of the fluid that is forced to flow through the first orifice passage 74, and to exhibit a low spring constant with respect to a high-frequency vibration around 45 Hz such as a fourth-order component of the engine idling vibrations, based on the resonance of the fluid which is forced to flow through the second orifice passage 76.

In the present embodiment, the pressure-receiving chamber 68, the volume-variable first and second equilibrium chambers 70, 72 which have substantially the same expansion spring constant are connected in series with one another through the first and second orifice passages 74, 76. Thus, the resonance frequency of the fluid flowing through the second orifice passage 76 is advantageously made higher than that of the fluid flowing through the first orifice passage 74.

The resonance frequency f1 of the fluid flowing through the first orifice passage 74 and the resonance frequency f2 of the fluid flowing through the second orifice passage 76 are easily tuned by adjusting the cross sectional areas A1, A2 and the lengths L1, L2 of the respective first and second orifice passages 74, 76, provided that the expansion spring constant of the first and second equilibrium chambers 70, 72 is kept constant. Accordingly, the resonance frequencies f1, f2 of the first and second orifice passages 74, 76 are set in a higher frequency range by increasing the ratios A1/L1, A2/L2. In this respect, the cross sectional area Al and the length L1 of the first orifice passage 74 and the cross sectional area A2 and the length L2 of the second orifice passage 76 are determined so as to assure sufficient amounts of the fluid flows which allow the engine mount 10 to exhibit a sufficiently high vibration damping or isolating effect based on the resonances of the fluid flowing through the first and second orifice passages 74, 76, respectively.

Figure 2:
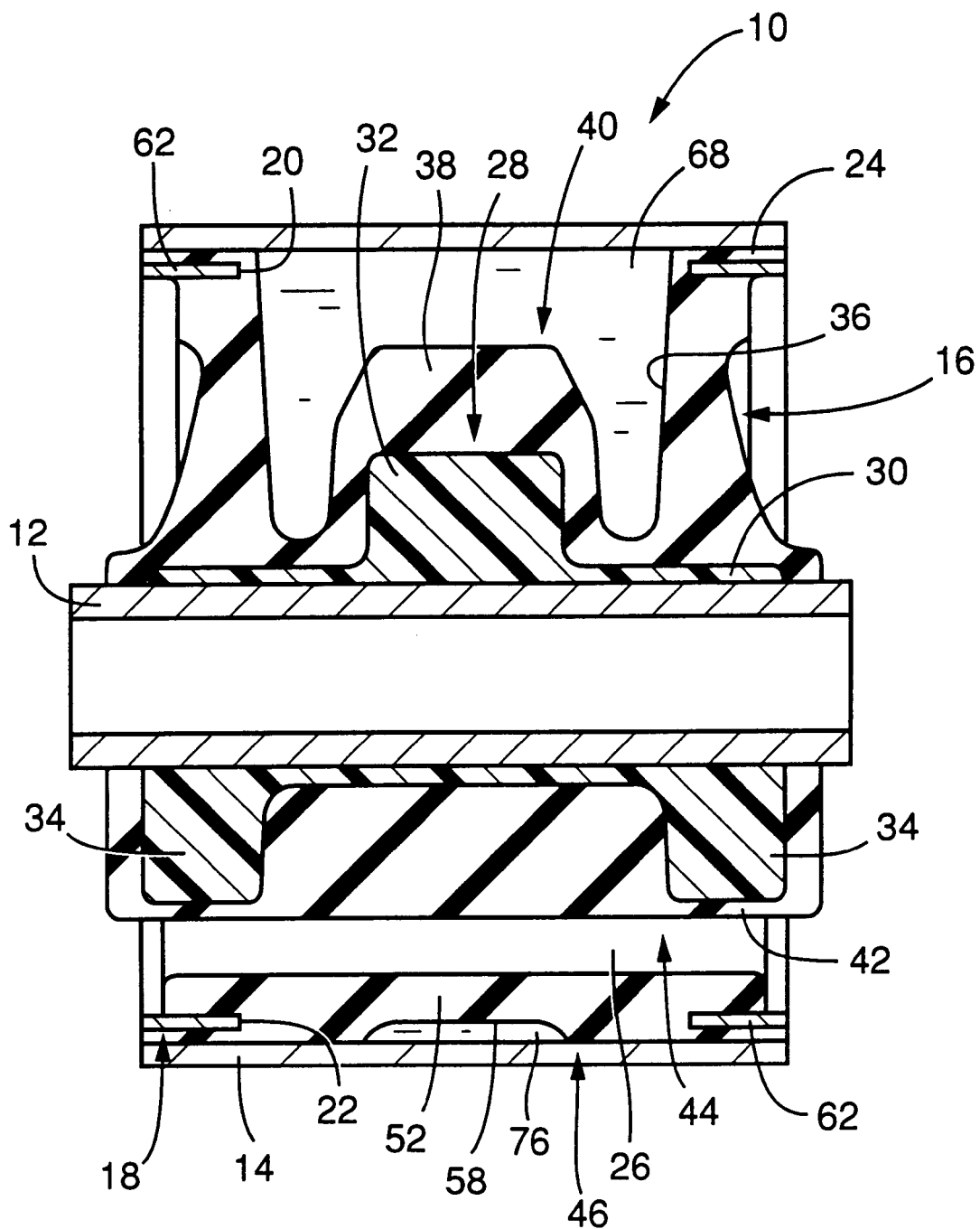
FIG. 2 is an elevational view in an axial cross section of the engine mount of FIG. 1.

As shown in FIGS. 1 and 3, the first orifice passage 74 has a sufficiently large cross sectional area and a relatively short length, while the second orifice passage 76 has a length slightly shorter than that of the first orifice passage 74 and a sufficiently small cross sectional area as shown in FIGS. 1 and 2. Thus, the second orifice passage 76 has a lower A/L ratio than the first orifice passage 74 (wherein "A" and "L" respectively represent the cross sectional area and length of each of the first and second orifice passages 74, 76). In the present embodiment, the second orifice passage 76 is partially defined by the connecting rubber member 52. In this case, the connecting rubber member 52 may be elastically displaced in a direction to increase the cross sectional area A of the second orifice passage 76 due to the increase of the pressure of the fluid contained in the engine mount 10 when the weight of the power unit acts on the engine mount 10 upon installation thereof on the vehicle. Accordingly, the cross sectional area A of the second orifice passage 76 before installation of the engine mount needs to be determined by taking account of the elastic displacement of the connecting rubber member 52, which elastic displacement will be caused by application of the weight of the power unit to the engine mount 10 upon installation thereof on the vehicle.

In the present engine mount constructed as described above, the ratio A2/L2 of the second orifice passage 76 is made lower than the ratio A1/L1 of the first orifice passage 74, so as to assure sufficient amounts of the fluid which is forced to flow through the first and second orifice passages 74, 76, respectively. In addition, the resonance frequency f2 of the fluid flowing through the second orifice passage 76 is determined to be adjacent to the resonance frequency f1 of the fluid flowing through the first orifice passage 74, so as to give an influence on the resonance of the fluid flowing through the first orifice passage 74.

According to the arrangement as described above, the engine mount 10 exhibits a low dynamic spring constant with respect to the input vibrations in a low frequency range to which the first orifice passage 74 is tuned, based on the resonance of the fluid flowing therethrough, while it exhibits a low dynamic spring constant with respect to the input vibrations in a high frequency range to which the second orifice passage 76 is tuned, based on the resonance of the fluid flowing therethrough. In addition, the present engine mount 10 prevents a considerable increase of the dynamic spring constant due to anti-resonance of the fluid flowing through the first orifice passage 74 in a middle frequency range between the above-described two frequency ranges to which the first and second orifice passages 74, 76 are tuned, respectively, based on the resonance of the fluid which is forced to flow through the second orifice passage 76, to thereby assure a sufficiently low dynamic spring constant in the above-indicated middle frequency range. Thus, the present engine mount 10 stably exhibits an excellent vibration isolating effect with respect to the input vibrations over a wide range of frequency from the low frequency range to which the first orifice passage 74 is tuned to the high frequency range to which the second orifice passage 76 is tuned.

The present engine mount 10 constructed as described above exhibits low dynamic spring constants based on the fluid flows through the first and second orifice passages 74, 76, with respect to the input vibrations over a sufficiently wide frequency range from about 25 Hz to which the first orifice passage 74 is tuned, to about 45 Hz to which the second orifice passage 76 is tuned. Accordingly, the present engine mount 10 exhibits an effective damping or isolating characteristic over a wide frequency range which covers vibrations from the first-order engine idling vibration to the fourth-order engine idling vibration. Further, the present engine mount 10 exhibits an effective damping or isolating characteristic with respect to the input vibrations in different frequency ranges which are generated depending upon the positions of the transmission. Thus, the present engine mount 10 is capable of stably exhibiting a significantly enhanced isolating effect with respect to the engine idling vibrations.

For effectively preventing the considerable increase of the dynamic spring constant which would be caused due to the anti-resonance of the fluid flowing through the first orifice passage 74 by utilizing the resonance of the fluid flowing through the second orifice passage 76, it is preferable to determine the resonance frequency values f1, f2 of the fluid flows through the respective first and second orifice passages 74, 76 such that the ratio f2/f1 is not higher than 2, or such that the difference between f2 and f1 is not larger than 30 Hz.

For more effectively preventing the considerable increase of the dynamic spring constant which would be caused due to the anti-resonance of the fluid flowing through the first orifice passage by the resonance of the fluid flowing through the second orifice passage 76, it is preferred that the ratio A2/L2 be determined to be lower than ½ of the ratio A1/L1. Alternatively, it is preferable to tune the first and second orifice passages 74, 76 such that a peak value of the dynamic spring constant which increases due to the anti-resonance of the fluid flowing through the first orifice passage 74 be smaller than a peak value of the dynamic spring constant which increases due to anti-resonance of the fluid flowing through the second orifice passage 76.

Figure 5:
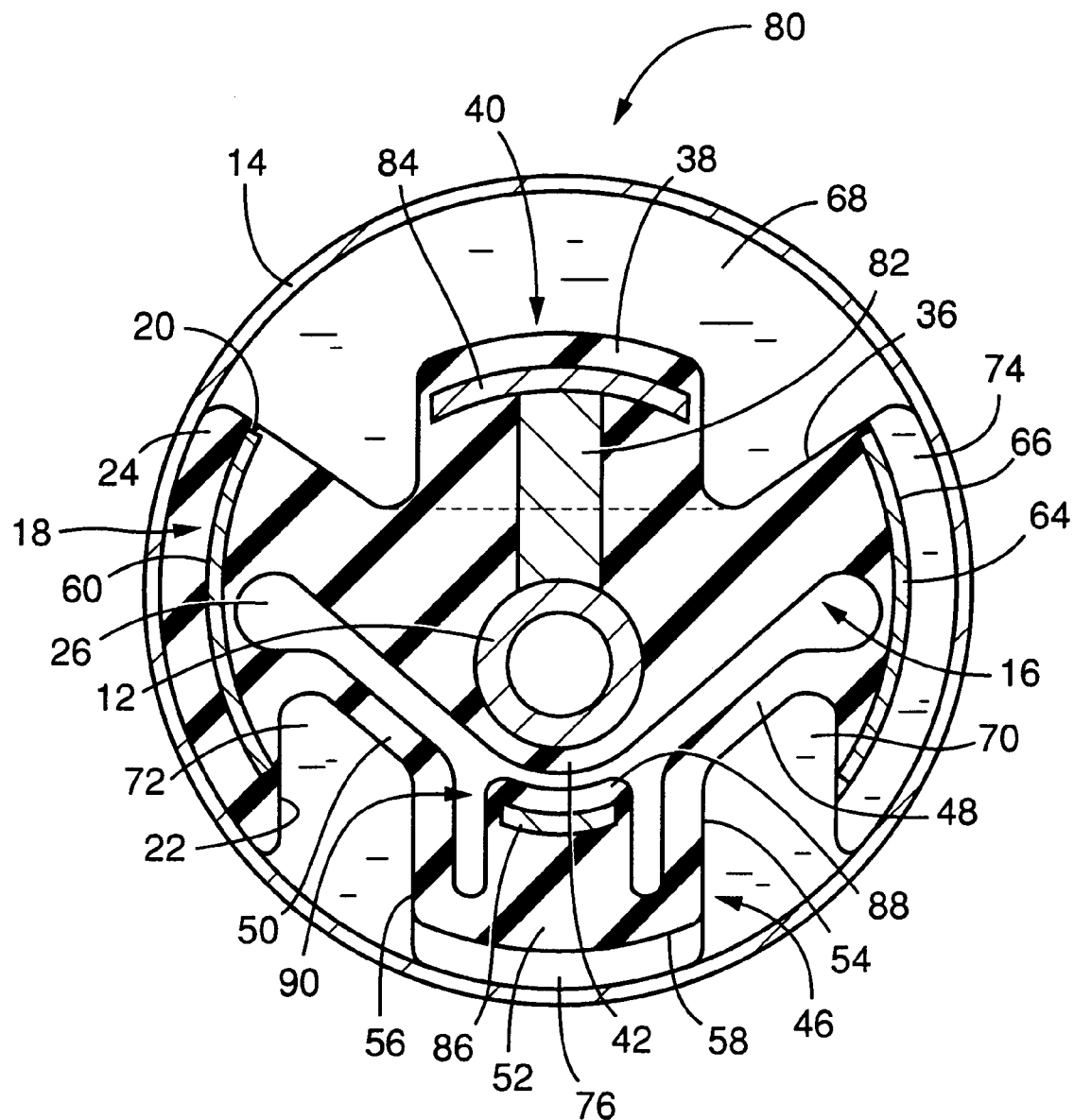
FIG. 5 is an elevational view in transverse cross section of an engine mount constructed according to a second embodiment of the present invention.
Figure 6:
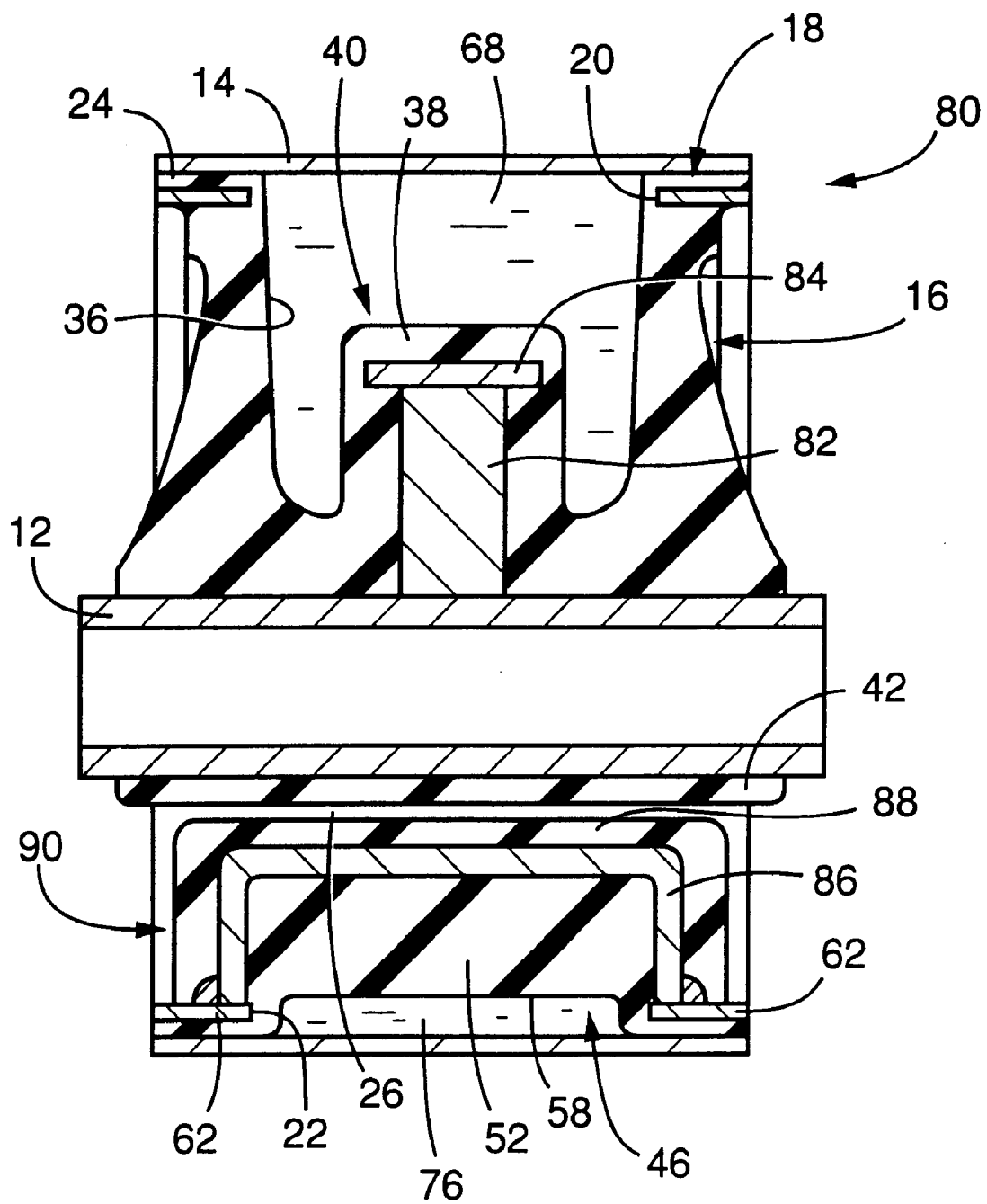
FIG. 6 is an elevational view in an axial cross section on the engine mount of FIG. 5.
Figure 7:
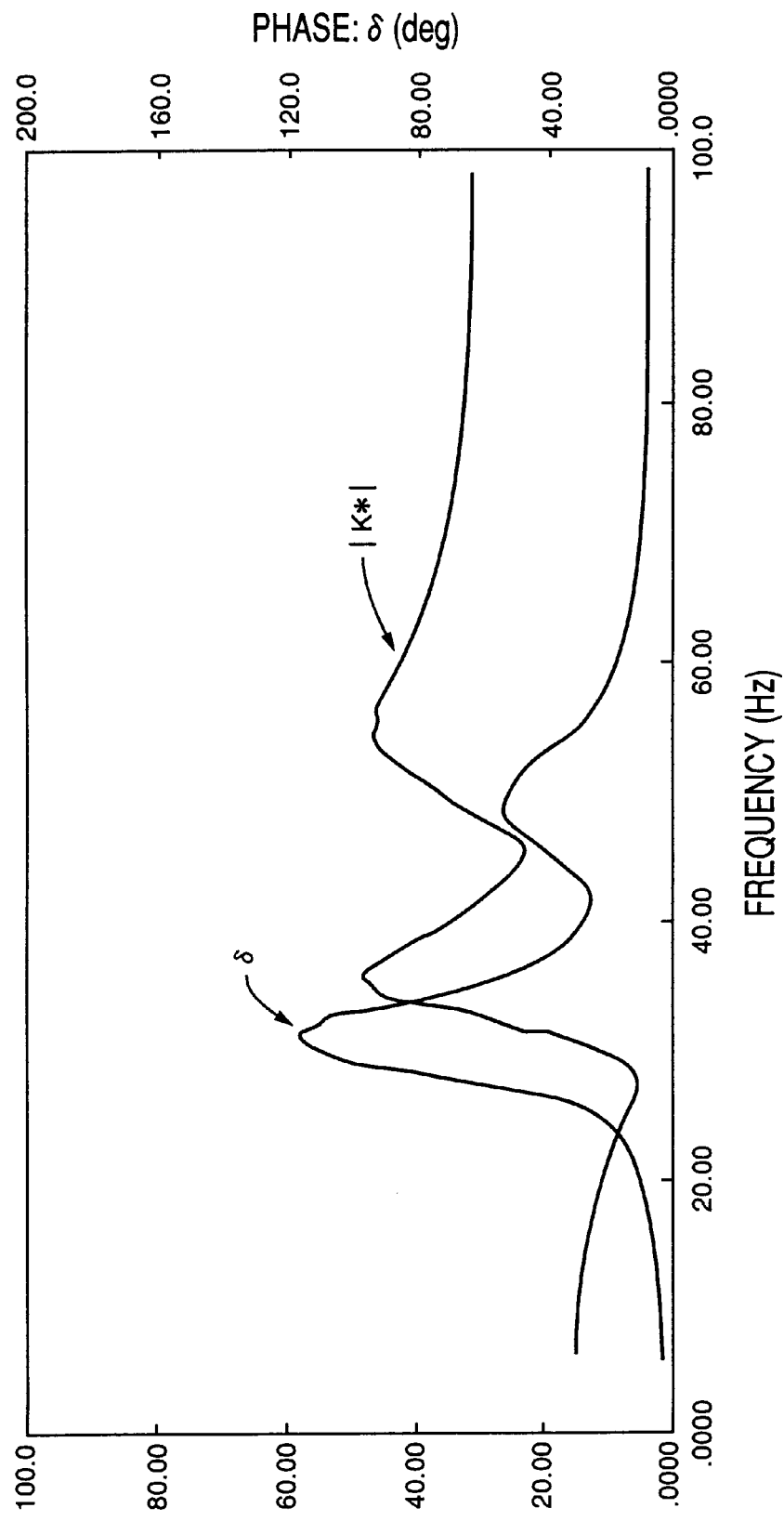
FIG. 7 is a graph showing the damping or isolating characteristic measured of an engine mount of Example (1)
Figure 8:
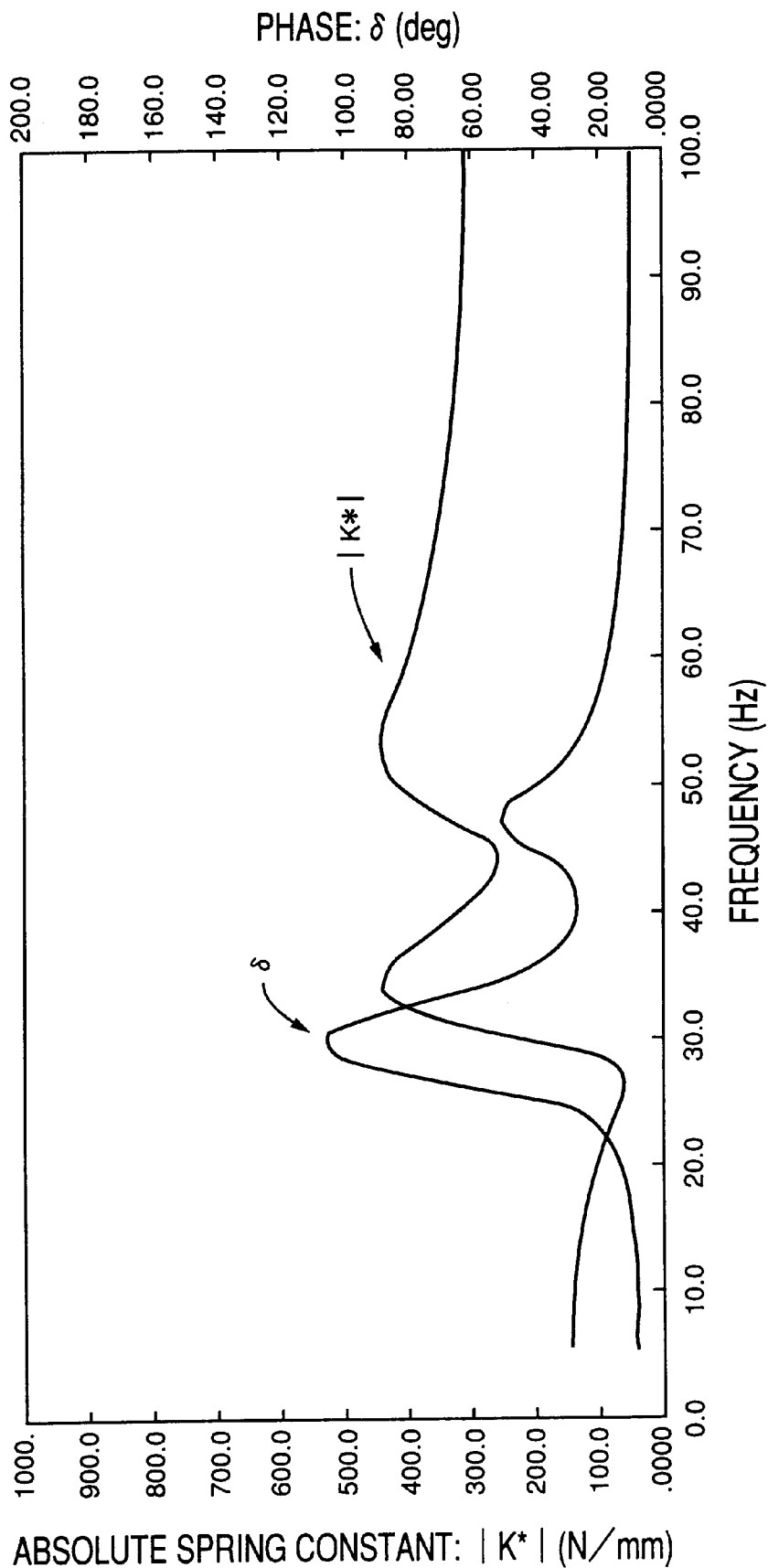
FIG. 8 is a graph showing the damping or isolating characteristic measured of an engine mount of Example (2)
Figure 9:
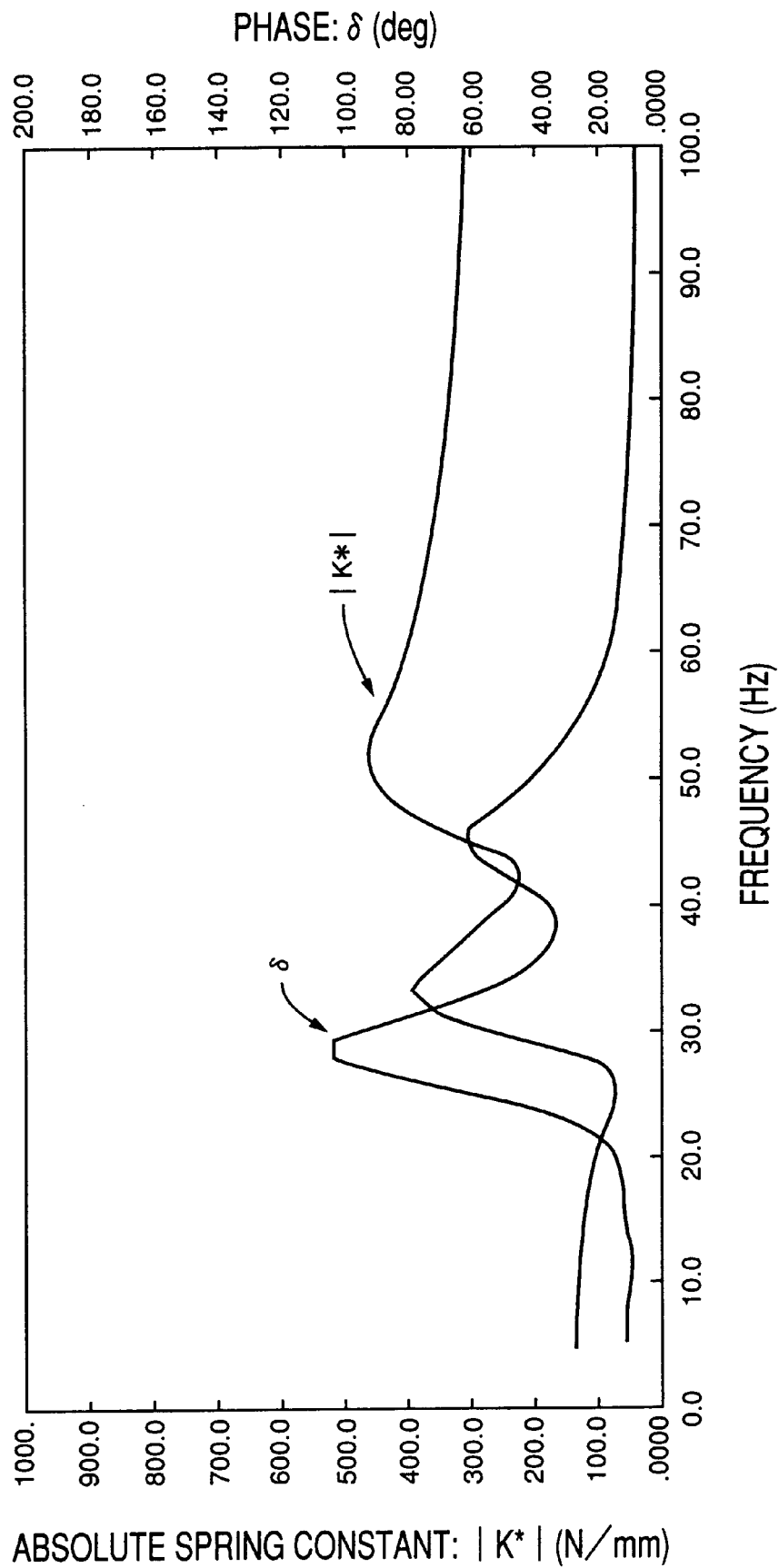
FIG. 9 is a graph showing the damping or isolating characteristic measured of an engine mount of Example (3)
Figure 10:
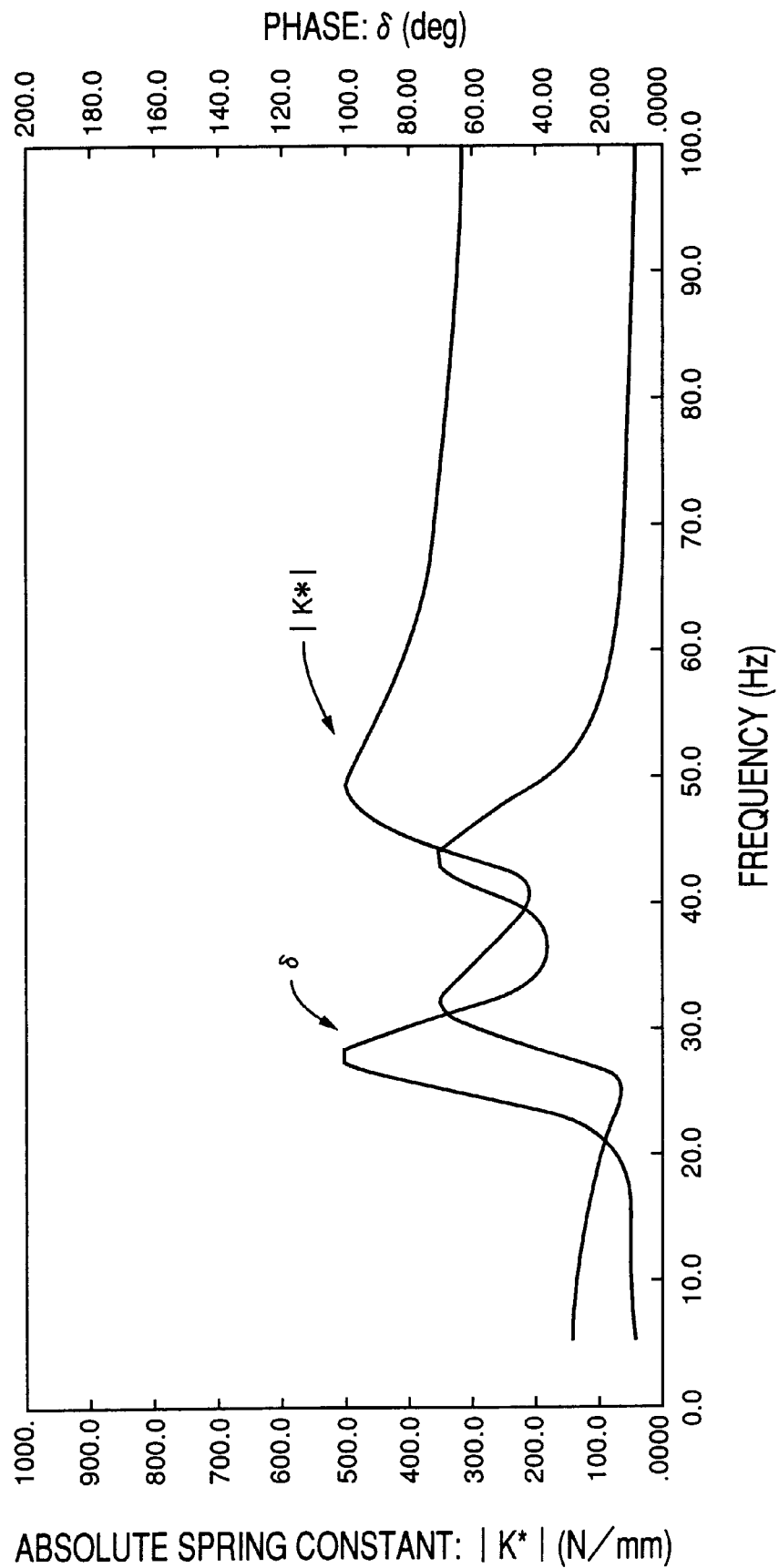
FIG. 10 is a graph showing the damping or isolating characteristic measured of an engine mount of Example (4)

Referring next to FIGS. 5 and 6, there is shown an engine mount 80 for use on a front-engine front-drive motor vehicle, which engine mount is constructed according to a second embodiment of the present invention. The engine mount 80 of this second embodiment is different from the engine mount 10 of the first embodiment in respect to the second orifice passage, in particular. The same reference numerals as used in the first embodiment will be used in this second embodiment to identify the functionally corresponding or structurally similar elements, which will not be described in detail to avoid redundancy of description.

In place of the stop block (28) in the engine mount 10 according to the first embodiment, the engine mount 80 of the second embodiment has a rod member 82 which is fixed to the axially middle portion of the inner sleeve 12 and extends toward the pressure-receiving chamber 68, and a wing member 84 which is fixed to the radial end of the rod member 82 and has a suitable circumferential dimension. These rod and wing members 82, 84 are formed of a suitable metallic material. The rod member 82 and the wing member 84 are covered with the rubber buffer 38, to thereby provide the first stop member 40 which extends from the inner sleeve 12 into the pressure-receiving chamber 68 with a suitable radial distance. A portion of the outer circumferential surface of the inner sleeve 12, which portion is located on the side of the axial void 26, is covered with the rubber buffer 42 having a suitable thickness.

The intermediate sleeve 18 has a restricting member 86 made of metal and located at the circumferentially intermediate portion of the second window 22. This restricting member 86 is a generally U-shaped member whose leg portions are bonded by welding to the axially opposite portions of the intermediate sleeve 18 adjacent to the second window 22, as shown in FIG. 6, so that the restricting member 86 extends between the above-indicated axially opposite portions of the intermediate sleeve 18. Thus, the restricting member 86 protrudes within the axial void 26 in a direction from the intermediate sleeve 18 toward the inner sleeve 12 with a suitable radial distance in the offset direction of the inner and intermediate sleeves 12, 18.

In the present engine mount 80, the connecting rubber member 52 which defines the bottom wall of the second orifice passage 76 has a comparatively large wall thickness. The restricting member 86 is bonded to the rubber connecting member 52 by vulcanization of a rubber material for the connecting rubber member 52. The surface of the restricting member 86 which is opposed to the the inner sleeve 12 is covered with a rubber buffer 88 formed integrally with the rubber connecting member 52.

The restricting member 86 and the rubber buffer 88 cooperate with each other to constitute a second stop member 90 which limits an amount of relative displacement of the inner and outer sleeves 12, 14 in the rebound direction owing to the abutting contact of the second stop member 90 with the inner sleeve 12 via the sealing rubber layer 42. Since the rubber connecting member 52 is fixed to the restricting member 86 of the intermediate sleeve 18, the rubber connecting member 52 is prevented from being elastically deformed, so that the configuration of the second orifice passage 76 is held substantially constant upon application of the vibrational load to the engine mount 80.

The engine mount 80 constructed according to the second embodiment provides substantially the same advantages as the engine mount (10) of the first embodiment as illustrated above. In addition, in the present engine mount 80, the configuration of the second orifice passage 76 can be held constant, whereby the resonance frequency of the fluid which is forced to flow through the second orifice passage 76 is easily tuned. Accordingly, the present engine mount 80 is capable of exhibiting the desired vibration damping or isolating characteristic with high stability.

While the presently preferred embodiments of this invention have been described above in detail for the illustrative purpose only, it is to be understood that the present invention is not limited to the details of the illustrated embodiments, but may be otherwise embodied.

The cross sectional area, length and configuration of each of the first and second orifice passages 74, 76 are not limited to those of the illustrated embodiments, but may be suitably determined depending upon the required vibration damping or isolating characteristic of the mount. For instance, the intermediate sleeve 18 may have three windows, and the first, second and third pockets 36, 54, 56 of the elastic body 16 are open in the outer circumferential surface of the intermediate sleeve 18 through the respective three windows. In this case, the intermediate sleeve 18 has grooves extending between the adjacent circumferentially opposite ends of the three windows, to thereby provide first and second orifice passages between the intermediate sleeve 18 and the outer sleeve 14.

The configurations and the positions of the pressure-receiving chamber, first and second equilibrium chambers are not limited to those of the illustrated embodiments. For instance, the equilibrium chambers may be formed within the pressure-receiving chamber, or the first and second equilibrium chambers may be formed in series with each other in the axial direction of the engine mount.

Further, the elastic layers which define the respective bottom walls of the first and second equilibrium chambers may be formed of materials different from each other, and may have thicknesses and sizes different from each other, so that the expansion spring constants of the first and second equilibrium chambers are made different from each other, whereby the first and second orifice passages are tuned as desired.

While the illustrated embodiments of this invention take the form of the engine mounts 10, 80 for a motor vehicle, the principle of the invention is equally applicable to various types of cylindrical vibration damping devices such as body mounts and differential mounts for motor vehicles, and various damping device used in various kinds of equipment other than the motor vehicles.

It is to be understood that the present invention may be embodied with various other changes, modifications and improvements, which may occur to those skilled in the art, without departing from the spirit and scope of the invention defined in the attached claims.

EXAMPLES

Various specimens of the engine mount 10 constructed according to the first embodiment of FIGS. 1–4 were prepared as Examples (1)–(4) indicated below. The engine mount specimens have the respective second orifice passages 76 which have different cross sectional areas A2. For each of the engine mount specimens of the Examples (1)–(4), there was measured a frequency characteristic of the vibration damping capability. The results are shown in the graphs of FIGS. 7–10, respectively.

Figure 11:
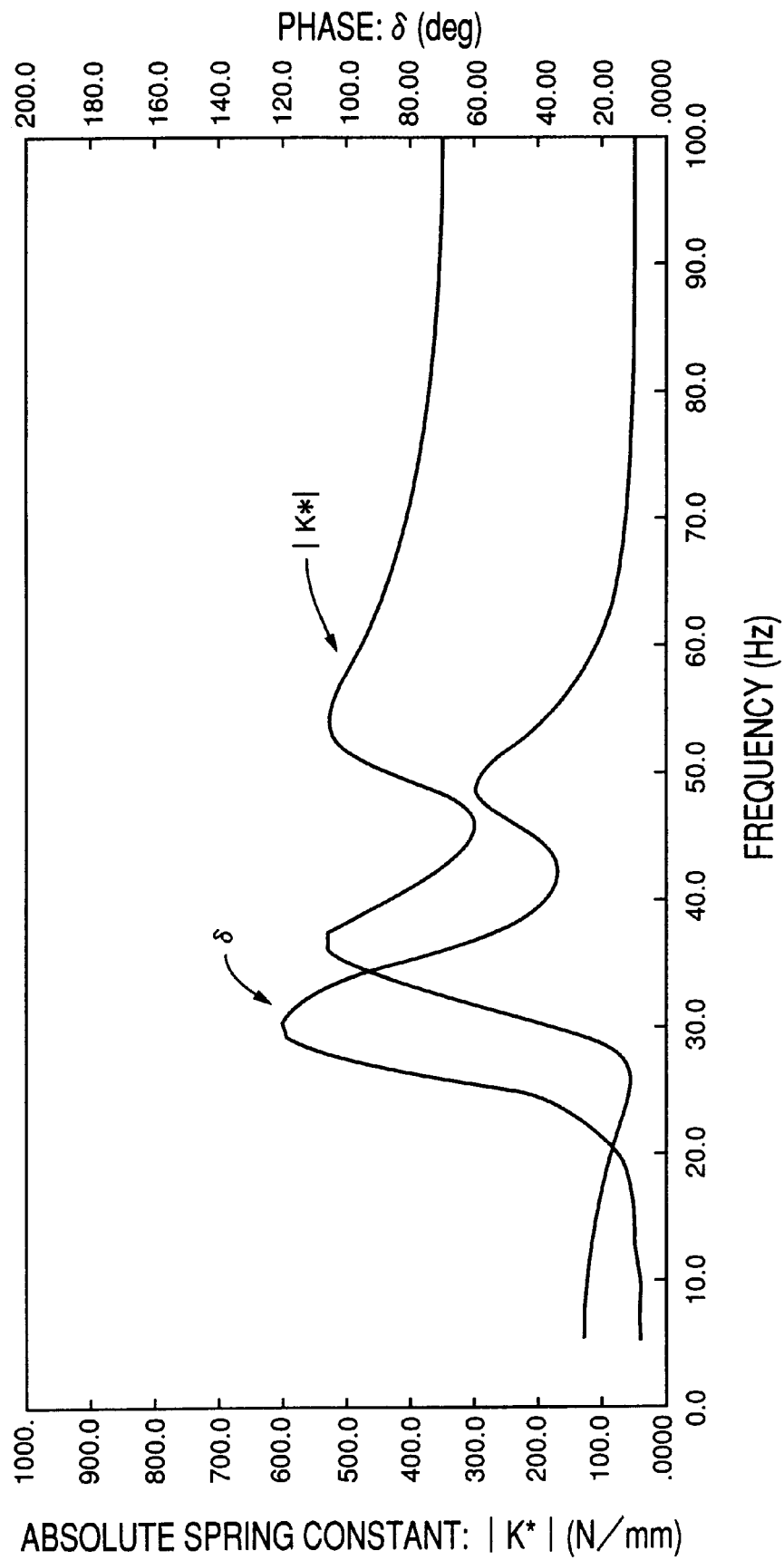
FIG. 11 is a graph showing the damping or isolating characteristic measured of an engine mount of Example (5)

The test was effected such that each engine mount specimen is subjected to a preload of 30 kgf, which is assumed to be the weight of the power unit acting on the engine mount when the transmission is placed in DRIVE position. The cross sectional area of the second orifice passage 76 prior to the installation in each Example is determined by taking account of an increase of the cross sectional area of the second orifice passage 76, which increase is caused by the weight or static load of the power unit that acts on the engine mount upon installation thereof on the vehicle. By using the engine mount specimen of Example (4), a similar test was effected as an Example (5) such that the engine mount specimen is subjected to a preload of 50 kgf, which is assumed to be the static load or weight of the power unit acting on the engine mount when the transmission is placed in the NEUTRAL position. The result of the test is indicated in the graph of FIG. 11.

EXAMPLE (1)

the first orifice passage cross sectional area $A1=189$ mm$^2$ length $L1=34.2$ mm ratio $A1/L1=5.53$
the second orifice passage cross sectional area $A2=72.4$ mm$^2$ length $L2=30$ mm ratio $A2/L2=2.41$
$(A2/L2)/(A1/L1)=0.435$

EXAMPLE (2)

the first orifice passage cross sectional area $A1=178.2$ mm$^2$ length $L1=34.2$ mm ratio $A1/L1=5.53$
the second orifice passage cross sectional area $A2=61.4$ mm$^2$ length $L2=30$ mm ratio $A2/L2=2.05$
$(A2/L2)/(A1/L1)=0.393$

EXAMPLE (3)

the first orifice passage cross sectional area $A1=180$ mm$^2$ length $L1=34.2$ mm ratio $A1/L1=5.26$
the second orifice passage cross sectional area $A2=50.4$ mm$^2$ length $L2=30$ mm ratio $A2/L2=1.68$
$(A2/L2)/(A1/L1)=0.319$

EXAMPLE (4)

the first orifice passage cross sectional area $A1=177$ mm$^2$ length $L1=34.2$ mm ratio $A1/L1=5.18$
the second orifice passage cross sectional area $A2=39.4$ mm$^2$ length $L2=30$ mm ratio $A2/L2=1.31$
$(A2/L2)/(A1/L1)=0.253$

EXAMPLE (5)

the first orifice passage cross sectional area $A1=177$ mm$^2$ length $L1=34.2$ mm ratio $A1/L1=5.18$
the second orifice passage cross sectional area $A2=42.9$ mm$^2$ length $L2=30$ mm ratio $A2/L2=1.43$
$(A2/L2)/(A1/L1)=0.276$ As is apparent from the results indicated in the graphs of FIGS. 7–11, the dynamic spring constant which increases by the anti-resonance of the fluid flowing through the first orifice passage is reduced to a level as low as the dynamic spring constant which increases by the anti-resonance of the fluid flowing through the second orifice passage. This arrangement effectively prevents considerable deterioration of the vibration damping or isolating capability of the engine mount in a frequency range between the resonance frequencies to which the first and second orifice passages are tuned, respectively. Further, it is clearly recognized from the results that all of the engine mount specimens of Examples (1)–(5) exhibited an excellent vibration damping or isolating capability in two frequency ranges around 25 Hz and 45 Hz, respectively.

Figure 12:
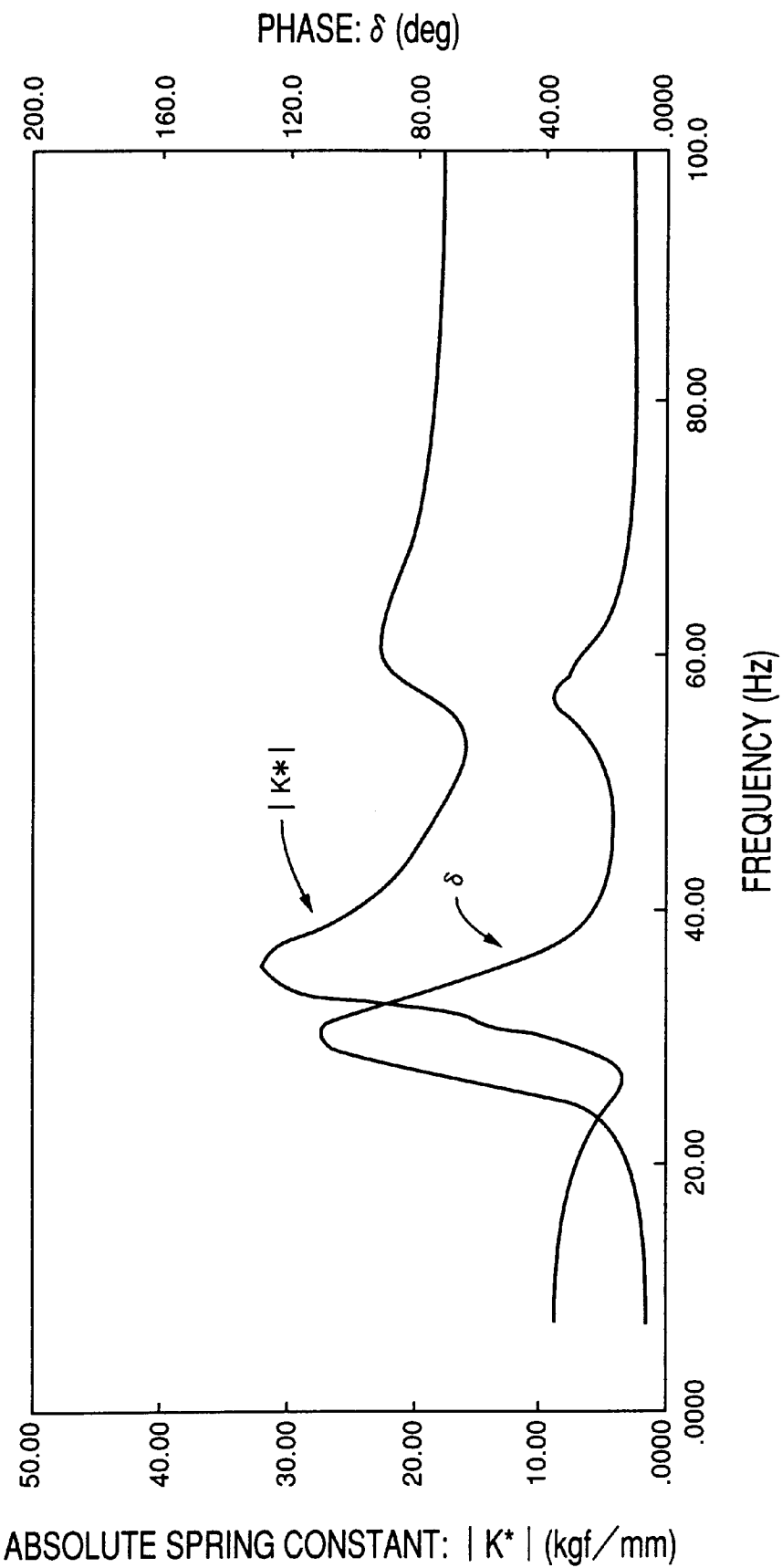
FIG. 12 is a graph showing the damping or isolating characteristic measured of an engine mount of Example (6)
Figure 13:
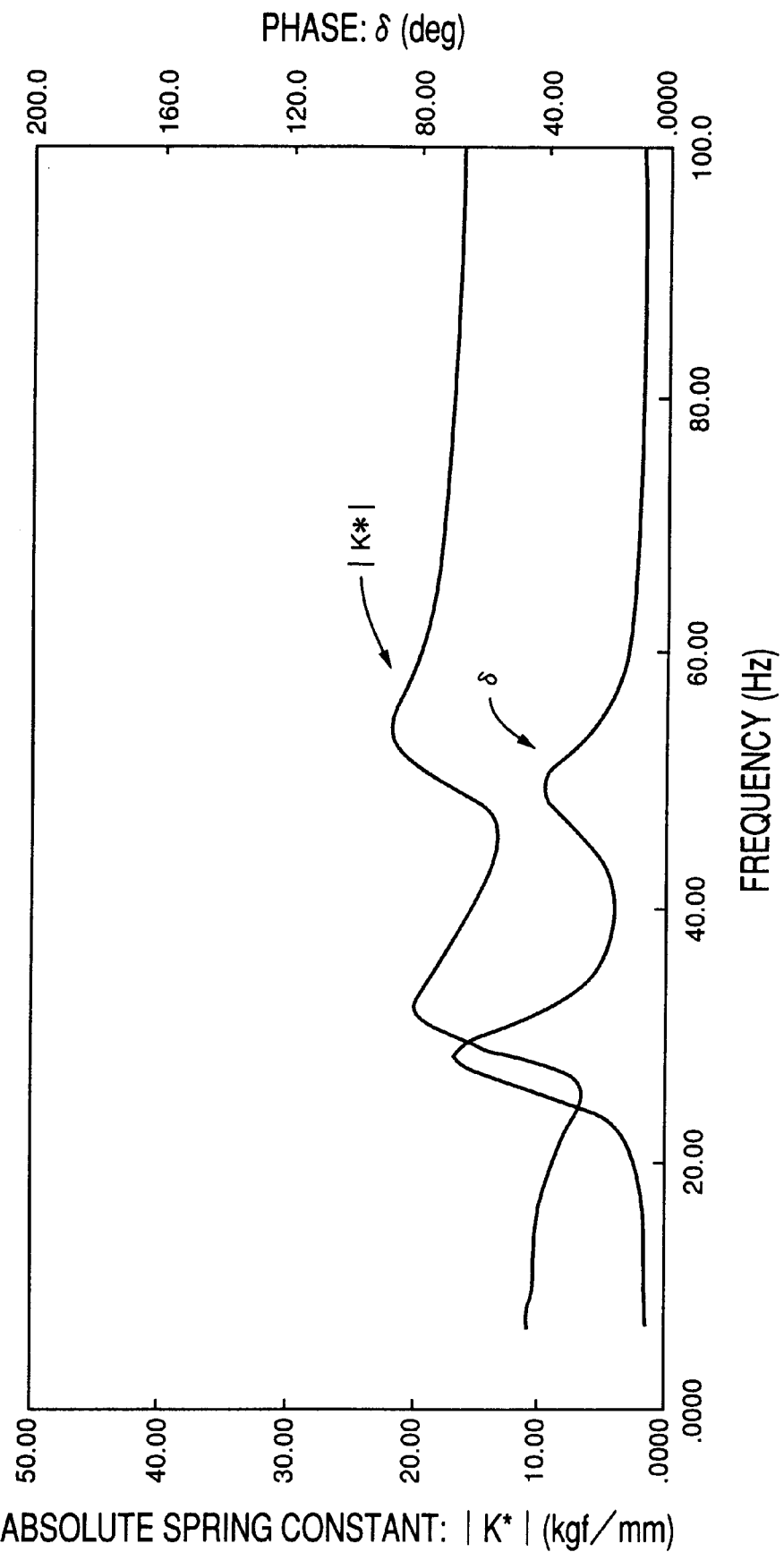
FIG. 13 is a graph showing the damping or isolating characteristic measured of an engine mount of Example (7)

Specimens of the engine mount 80 constructed according to the second embodiment of FIGS. 5–6 were prepared as Examples (6)–(7) indicated below. The engine mount specimens have the respective second orifice passages 76 which have different cross sectional areas $A2$. For each of the engine mount specimens of the Examples (6)–(7), there was measured a frequency characteristic of the vibration damping or isolating capability. The results are shown in the graphs of FIGS. 12–13, respectively.

Figure 14:
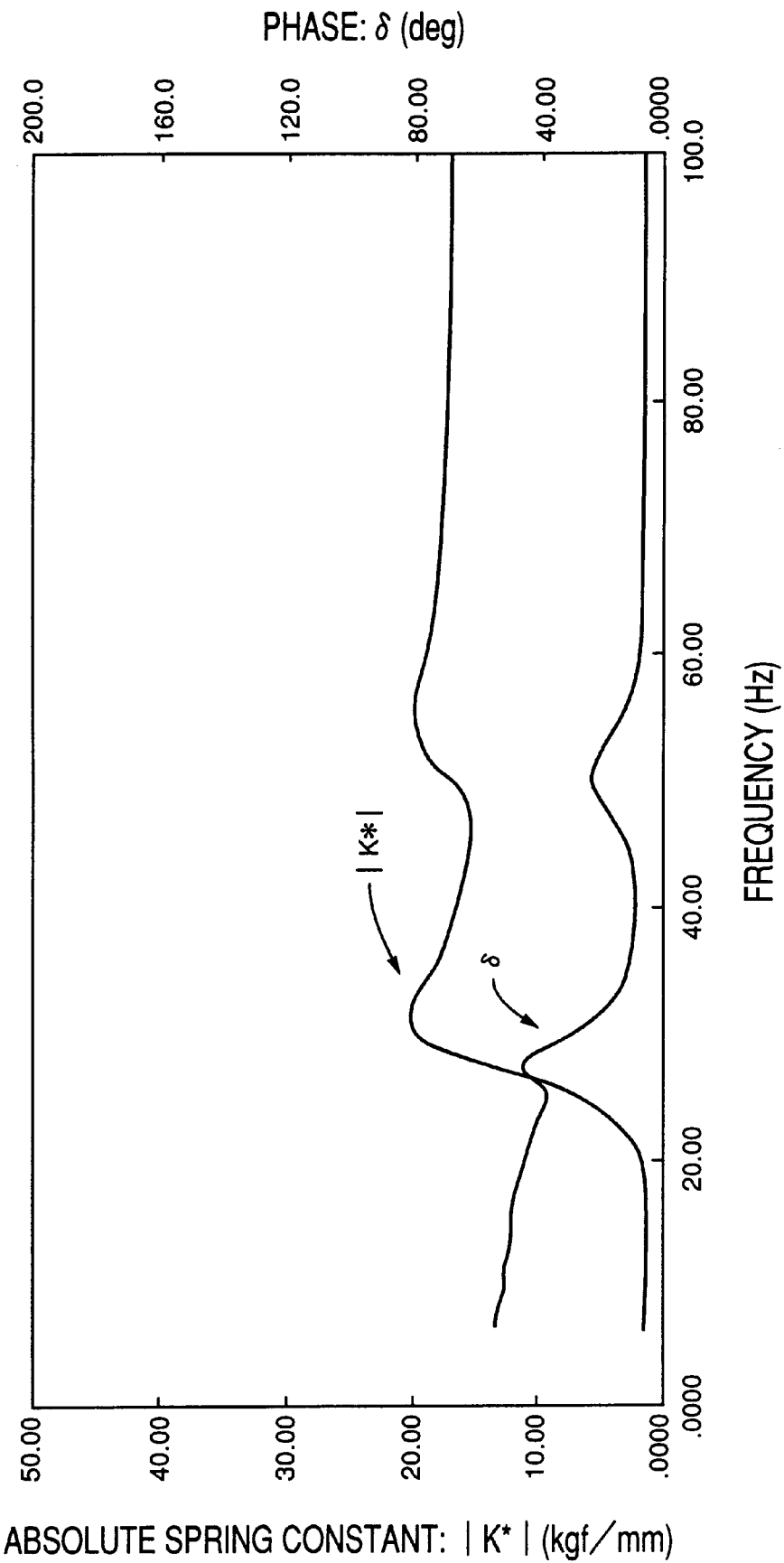
FIG. 14 is a graph showing the damping or isolating characteristic measured of an engine mount of Example (8)
Figure 15:
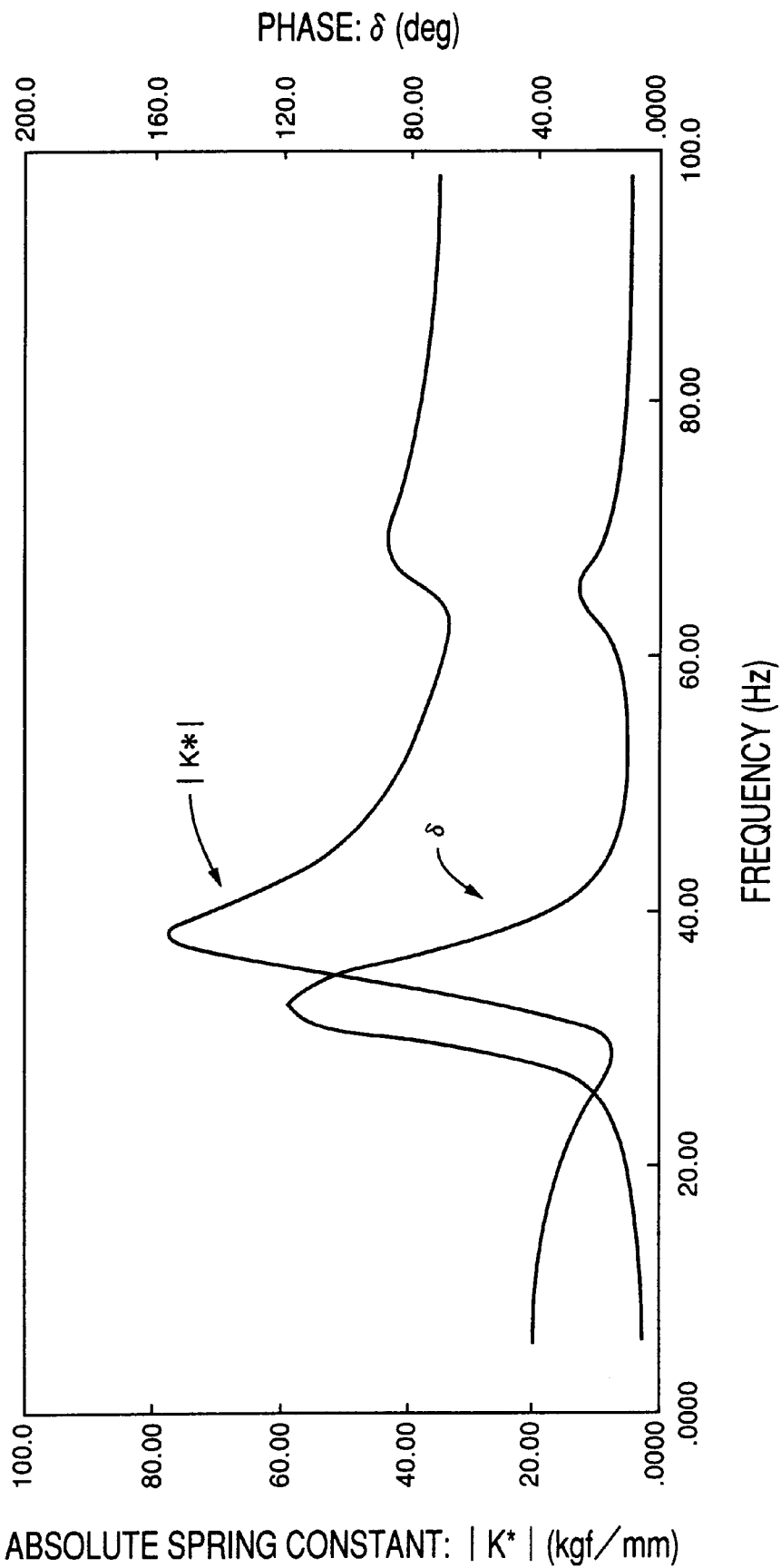
FIG. 15 is a graph showing the damping or isolating characteristic measured of an engine mount as a comparative example.

The test was effected such that each engine mount specimen is subjected to a preload of 40 kgf, which is assumed to be the weight of the power unit acting on the engine mount when the transmission shift lever is placed in DRIVE position. By using the engine mount specimen of Example (7), a similar test was effected as an Example (8) such that the engine mount specimen is subjected to a preload of 80 kgf, which is assumed to be the weight of the power unit acting on the engine mount when the transmission is placed in NEUTRAL position. The result of the test is indicated in the graph of FIG. 14. A similar test was conducted on an engine mount specimen as a comparative example as indicated below. In this engine mount of the comparative example, the ratio $A2/L2$ of the second orifice passage 76 was made higher than the ratio $A1/L1$ of the first orifice passage 74. The result is shown in the graph of FIG. 15.

EXAMPLE (6)

the first orifice passage cross sectional area $A1=127.2$ mm$^2$ length $L1=40.3$ mm ratio $A1/L1=3.15$
the second orifice passage cross sectional area $A2=66.5$ mm$^2$ length $L2=30$ mm ratio $A2/L2=2.21$
$(A2/L2)/(A1/L1)=0.70$

EXAMPLE (7)

the first orifice passage cross sectional area $A1=127.2$ mm$^2$ length $L1=40.3$ mm ratio $A1/L1=3.15$
the second orifice passage cross sectional area $A2=35.0$ mm$^2$ length $L2=30$ mm ratio $A2/L2=1.17$
$(A2/L2)/(A1/L1)=0.37$

EXAMPLE (8)

the first orifice passage cross sectional area $A1=127.2$ mm$^2$ length $L1=0.3$ mm ratio $A1/L1=3.15$
the second orifice passage cross sectional area $A2=35.0$ mm$^2$ length $L2=30$ mm ratio $A2/L2=1.17$
$(A2/L2)/(A1/L1)=0.37$

Comparative Example the first orifice passage cross sectional area $A1=127.2$ mm$^2$ length $L1=40.3$ mm ratio $A1/L1=3.15$
the second orifice passage cross sectional area $A2=133$ mm$^2$ length $L2=30$ mm ratio $A2/L2=4.43$
$(A2/L2)/(A1/L1)=1.41$ As is apparent from the results as shown in the graphs of FIGS. 12–14, like the engine mount of the first embodiment, the engine mount constructed according to the second embodiment is capable of exhibiting an excellent vibration damping or isolating effect based on the resonances of the fluid flowing through the first and second orifice passages, respectively. In particular, the comparison of the results between the engine mounts of the present invention and the engine mount of the comparative example clearly indicates that the increase of the dynamic spring constant due to the anti-resonance of the fluid flowing through the first orifice passage is effectively prevented owing to the resonance of the fluid flowing through the second orifice passage, in the present engine mounts. It is further recognized that the present engine mounts effectively exhibited sufficiently low spring constants based on the resonance of the fluid flowing through the second orifice passage. Accordingly, the engine mount constructed according to the present invention is capable of damping or isolating the input vibrations over a wide frequency range.

As clearly understood from the results as shown in the graphs of FIGS. 12–14, in the engine mounts wherein the values "$(A2/L2)/(A1/L1)$" were made lower than ½, the increase of the dynamic spring constant due to the anti-resonance of the fluid flowing through the first orifice passage was effectively prevented owing to the resonance of the fluid flowing through the second orifice passage.

It will be understood from the above description that, in the fluid-filled cylindrical vibration damping device constructed according to the present invention, the increase of the dynamic spring constant due to the anti-resonance of the fluid flowing through the first orifice passages prevented by the resonance of the fluid flowing through the second orifice passage, so that the present engine mount exhibits stable vibration damping or isolating characteristics over a wide frequency range on the basis of the resonances of the fluid flowing through the first and second orifice passages, respectively.

What is claimed is:

1. A fluid-filled cylindrical vibration damping device comprising:
   an inner sleeve member;
   an outer sleeve member disposed radially outwardly of said inner sleeve member in a spaced-apart relation with said inner sleeve member;
   an elastic body interposed between said inner sleeve member and said outer sleeve member for elastically connecting said inner and outer sleeve members with each other;
   a pressure-receiving chamber which is formed between said inner sleeve member and said outer sleeve member and filled with a non-compressible fluid, said pressure-receiving chamber being partially defined by said elastic body so that a pressure of said fluid in said pressure-receiving chamber changes upon application of a vibrational load to the vibration damping device;
   a first flexible diaphragm with opposite surfaces, one of said opposite surfaces partially defines a first equilibrium chamber filled with said non-compressible fluid and the other of said opposite surfaces partially defines an axial void which extends in an axial direction of said inner sleeve member and which is partially defined by said elastic body, said first flexible diaphragm being displaceable to permit a change in a volume of said first equilibrium chamber;
   a second flexible diaphragm which partially defines a second equilibrium chamber filled with said non-compressible fluid, said second flexible diaphragm being displaceable to permit a change in a volume of said second equilibrium chamber;
   first orifice passage defining means for defining a first orifice passage which permits fluid communication between said pressure-receiving chamber and said first equilibrium chamber;
   second orifice passage defining means for defining a second orifice passage which permits fluid communication between said first equilibrium chamber and said second equilibrium chamber, said second orifice passage having a ratio A/L which is smaller than that of said first orifice passage, wherein A and L are a cross sectional area and a length of each of said first and second orifice passages, respectively;
   wherein said fluid flowing in said first orifice passage has a first resonance frequency f1 while said fluid flowing in said second orifice passage has a second resonance frequency f2 which is higher than said first resonance frequency f1; and
   wherein said pressure-receiving chamber, said first equilibrium chamber, and said second equilibrium chamber are connected in series with one another, said second equilibrium chamber being directly connected only to said first equilibrium chamber through said second orifice passage.

2. A fluid-filled cylindrical vibration damping device according to claim 1, wherein said first flexible diaphragm which partially defines said first equilibrium chamber is provided by a first elastic layer while said second flexible diaphragm which partially defines said second equilibrium chamber is provided by a second elastic layer, said first and second equilibrium chambers being partially defined by respective walls which have substantially the same expansion spring constant.

3. A fluid-filled cylindrical vibration damping device according to claim 2, wherein an axial void is formed between said inner sleeve member and said outer sleeve member and in one of two circumferential portions of the damping device which are diametrically opposed to each other while said elastic body is interposed between said inner sleeve member and said outer sleeve member and in substantially the other of said two circumferential portions of the damping device, said first equilibrium chamber and said second equilibrium chamber being located within said axial void such that said first and second equilibrium chambers are spaced apart from each other in a circumferential direction of said axial void, said first and second flexible diaphragms which partially define said first and second equilibrium chambers, respectively, being provided by said first and second elastic layers which are formed substantially independently of said elastic body.

4. A fluid-filled cylindrical vibration damping device according to claim 1, further comprising an intermediate sleeve bonded to an outer circumferential surface of said elastic body and including a plurality of windows through which a first pocket that is partially defined by said elastic body, a second pocket that is partially defined by said first flexible diaphragm and a third pocket that is partially defined by said second flexible diaphragm are open in an outer circumferential surface of said intermediate sleeve, said outer sleeve member being fitted on said intermediate sleeve so as to fluid-tightly close said first, second and third pockets, to thereby provide said pressure-receiving chamber, said first equilibrium chamber and said second equilibrium chamber, respectively.

5. A fluid-filled cylindrical vibration damping device according to claim 1, wherein said second orifice passage is partially defined by an elastic member which is elastically deformed based on a pressure of said fluid which is forced to flow through said second orifice passage.

6. A fluid-filled cylindrical vibration damping device according to claim 1, wherein a ratio f2/f1 of said second resonance frequency f2 to said first resonance frequency f1 is not higher than 2.

7. A fluid-filled cylindrical vibration damping device according to claim 1, wherein a difference f2−f1 between said second resonance frequency f2 and said first resonance frequency f1 is not larger than 30 Hz.

8. A fluid-filled cylindrical vibration damping device according to claim 1, wherein said elastic body is disposed in one of two circumferential portions of the vibration damping device which are opposed to each other in a diametric direction in which said vibrational load is primarily applied while said axial void is formed in the other circumferential portion, said first and second equilibrium chambers being formed on circumferentially opposite sides of a portion of said axial void which is opposed to said inner sleeve member in said direction in which said vibrational load is primarily applied, so that said first and second equilibrium chambers are spaced from each other by a suitable distance in a circumferential direction of said outer sleeve, said second orifice passage which permits fluid communication between said first and second equilibrium chambers being formed so as to extend along an inner circumferential surface of said outer sleeve member in said circumferential direction thereof, between portions of said inner sleeve member and said outer sleeve member which are opposed to each other.

9. A fluid-filled cylindrical vibration damping device according to claim 8, further comprising an elastic stop member which protrudes from at least one of said inner sleeve member and said outer sleeve member toward the other of said inner sleeve member and said outer sleeve member, between said first and second equilibrium chambers in said direction in which said vibrational load is primarily applied.

10. A fluid-filled cylindrical vibration damping device according to claim 9, wherein said elastic stop member serves as a rebound stopper for limiting an amount of relative displacement of said inner sleeve member and said outer sleeve member in a rebound direction of said vibrational load which is applied to the vibration damping device.

11. A fluid-filled cylindrical vibration damping device according to claim 9, wherein said elastic stop member is reinforced by a reinforcing member.

12. A fluid-filled cylindrical vibration damping device according to claim 1, further comprising an elastic stop member serving as a bound stopper for limiting an amount of relative displacement of said inner sleeve member and said outer sleeve member in a bound direction of said vibrational load which is applied to the vibration damping device.

* * * * *